US011258796B2

United States Patent
Kohli et al.

(10) Patent No.: US 11,258,796 B2
(45) Date of Patent: Feb. 22, 2022

(54) DATA PROCESSING UNIT WITH KEY VALUE STORE

(71) Applicant: Fungible, Inc., Santa Clara, CA (US)

(72) Inventors: Jaspal Kohli, Sunnyvale, CA (US); Bertrand Serlet, Palo Alto, CA (US); Xiaoqin Ma, Los Altos, CA (US); Daniel James Nigel Picken, Sunnyvale, CA (US)

(73) Assignee: Fungible, Inc., Santa Clara, CA (US)

( * ) Notice: Subject to any disclaimer, the term of this patent is extended or adjusted under 35 U.S.C. 154(b) by 207 days.

(21) Appl. No.: 16/504,112

(22) Filed: Jul. 5, 2019

(65) Prior Publication Data

US 2020/0014688 A1    Jan. 9, 2020

Related U.S. Application Data

(60) Provisional application No. 62/694,351, filed on Jul. 5, 2018.

(51) Int. Cl.
*H04L 29/06* (2006.01)
*H04L 9/06* (2006.01)
*H04L 9/08* (2006.01)

(52) U.S. Cl.
CPC ............ *H04L 63/10* (2013.01); *H04L 9/0643* (2013.01); *H04L 9/0891* (2013.01); *H04L 9/0894* (2013.01)

(58) Field of Classification Search
CPC ..... H04L 63/10; H04L 9/0643; H04L 9/0891; H04L 9/0894; G06F 16/2343
See application file for complete search history.

(56) References Cited

U.S. PATENT DOCUMENTS

| | | | |
|---|---|---|---|
| 5,440,732 A | 8/1995 | Lomet et al. | |
| 6,212,610 B1 * | 4/2001 | Weber | G06F 12/0813 709/213 |
| 6,792,432 B1 * | 9/2004 | Kodavalla | G06F 16/2308 |
| 10,540,288 B2 | 1/2020 | Noureddine et al. | |
| 11,119,997 B2 * | 9/2021 | Gurajada | G06F 12/0253 |
| 2004/0210582 A1 * | 10/2004 | Chatterjee | G06F 16/27 |

(Continued)

FOREIGN PATENT DOCUMENTS

WO    2015116208 A1    8/2015

OTHER PUBLICATIONS

Apache Casandra, Apache Software Foundation, casandraapache.org, 2016 (Applicant points out, in accordance with MPEP 609.04(a), that the year of publication, 2016, is sufficiently earlier than the effective U.S. filing date, so that the particular month of publication is not in issue.) 6 pp.

(Continued)

*Primary Examiner* — Michael R Vaughan
(74) *Attorney, Agent, or Firm* — Shumaker & Sieffert, P.A.

(57) ABSTRACT

A key-value store supporting GET, PUT and DELETE operations, serializes multiple clients using two locks, and that supports asynchronous resizing. The locking scheme includes an operation of holding two locks, one for the key involved in the operation, one for the page currently searched or updated. The store can either be a single volume holding keys and data or can be organized as a directory volume referencing a number of data volumes organized by data-size ranges. The scheme also supports asynchronous resizing of the directory while continuing to perform operations.

25 Claims, 12 Drawing Sheets

(56) References Cited

U.S. PATENT DOCUMENTS

| | | | |
|---|---|---|---|
| 2008/0086470 A1* | 4/2008 | Graefe | G06F 16/2343 |
| 2009/0276430 A1 | 11/2009 | Bruso et al. | |
| 2010/0281013 A1* | 11/2010 | Graefe | G06F 16/2246 |
| | | | 707/715 |
| 2010/0281062 A1* | 11/2010 | Ushiyama | G06F 16/1837 |
| | | | 707/797 |
| 2010/0306222 A1* | 12/2010 | Freedman | G06F 16/9027 |
| | | | 707/759 |
| 2012/0310987 A1* | 12/2012 | Dragojevic | G06F 9/467 |
| | | | 707/792 |
| 2013/0086073 A1* | 4/2013 | Lyle | G06F 16/2255 |
| | | | 707/747 |
| 2013/0262423 A1* | 10/2013 | Graefe | G06F 16/2343 |
| | | | 707/703 |
| 2017/0242880 A1* | 8/2017 | Barzilli | G06F 16/2246 |
| 2018/0287965 A1 | 10/2018 | Sindhu et al. | |
| 2018/0307620 A1* | 10/2018 | Zhou | G06F 12/0246 |
| 2019/0012278 A1 | 1/2019 | Sindhu et al. | |
| 2019/0013965 A1 | 1/2019 | Sindhu et al. | |
| 2019/0158428 A1 | 5/2019 | Gray et al. | |

OTHER PUBLICATIONS

Riak KV Configuration Reference, retrieved from https://docs.riak.eom/riak/kv/2.2.3/configuring/reference/#object-settings on Feb. 7, 2020, 32 pp.

International Search Report and Written Opinion of International Application No. PCT/US2019/040718, dated Sep. 16, 2019, 15 pp.

U.S. Appl. No. 16/746,344, filed Jan. 17, 2020, naming inventors Noureddine et al.

International Preliminary Report on Patentability from International Application No. PCT/US2019/040718, dated Jan. 5, 2021, 10 pp.

* cited by examiner

DATA PROCESSING UNIT WITH KEY VALUE STORE

This application claims the benefit of U.S. Provisional Patent Application 62/694,351, filed Jul. 5, 2018, the entire content of which is incorporated by reference.

TECHNICAL FIELD

The invention relates to computer networks and, more particularly, data center networks.

BACKGROUND

In a typical cloud-based data center, a large collection of interconnected servers provides computing and/or storage capacity for execution of various applications. For example, a data center may comprise a facility that hosts applications and services for subscribers, i.e., customers of the data center. The data center may, for example, host all of the infrastructure equipment, such as compute nodes, networking and storage systems, power systems, and environmental control systems.

Storage and retrieval of data may consume a considerable amount of the computational resources of the servers of the data center. For example, storage and retrieval of pictures, authentication credentials, documents, and other types of data may consume computational resources of the servers of the data center.

SUMMARY

In general, this disclosure describes techniques for efficiently implementing a key-value store. A data processing unit (DPU) may comprise a multiple core processor system that may be optimized for stream processing. In some examples, DPUs of a data center may store and retrieve data from the key-value store instead of the servers of the data center. In other words, the DPUs may offload the storage and retrieval functionality from the servers. This offloading may free up computational resources of the servers to perform more sophisticated functions.

In one example, this disclosure describes a method for storage of data, the method comprising: in response to a request to perform an operation on data associated with a key: obtaining a lock on the key; determining, based on a hash of the key, a page associated with the key, wherein: the page associated with the key is in a set of pages stored in a volume, and each respective page of the one or more pages stores a respective part of an array of slots; after obtaining the lock on the key, obtaining a lock on the page associated with the key; after obtaining the lock on the page associated with the key: determining a slot associated with the key, wherein the part of the array of slots stored by the page associated with the key contains the slot associated with the key or contains keys used to determine the slot associated with the key; using the slot associated with the key to perform the operation on the data associated with the key, wherein the operation is a get operation, a put operation, or a delete operation; and releasing the lock on the page associated with the key and the lock on the key.

In another example, this disclosure describes a method of storing data, the method comprising: storing a directory in a first volume, the directory comprising a plurality of pages; in response to a request to perform an operation on data associated with a key: determining, based on a hash of the key, a page associated with the key, the page associated with the key being in the plurality of pages in the directory; determining a slot associated with the key, wherein the page associated with the key contains the slot associated with the key or contains keys used to determine the slot associated with the key; reading an address stored in the slot associated with the key; using the address to determine a storage location in a second volume; and performing the operation with respect to data in the storage location, wherein the operation is a get operation, a put operation, or a delete operation.

In another example, this disclosure describes a method of storing data, the method comprising: storing a set of pages in a volume, wherein each page in the set of pages stores a respective part of an array of slots, wherein the array of slots has a first size; updating a parameter to indicate a second size of the array of slots greater than the first size of the array of slots; and for each respective page of the set of one or more pages, performing a resize operation for the respective page, wherein performing the resize operation for the respective page comprises, for each respective slot in the part of the array of slots stored in the respective page: in response to determining that a key is stored in the respective slot, determining, based on a hash of the key stored in the respective slot and the second size of the array of slots, a destination page in the set of pages; and based on the destination page being different from the respective page, moving data in the respective slot from the respective page to a slot in the part of the array stored in the destination page.

In another example, this disclosure describes a computing system comprising: a storage device; and one or more processors configured to: in response to a request to perform an operation on data associated with a key: obtain a lock on the key; determine, based on a hash of the key, a page associated with the key, wherein: the page associated with the key is in a set of pages stored in a volume stored in the storage device, and each respective page of the one or more pages stores a respective part of an array of slots; after obtaining the lock on the key, obtain a lock on the page associated with the key; after obtaining the lock on the page associated with the key: determine a slot associated with the key, wherein the part of the array of slots stored by the page associated with the key contains the slot associated with the key or contains keys used to determine the slot associated with the key; use the slot associated with the key to perform the operation on the data associated with the key, wherein the operation is a get operation, a put operation, or a delete operation; and release the lock on the page associated with the key and the lock on the key.

In another example, this disclosure describes a computer-readable storage medium comprising instructions for execution by a programmable processor, wherein execution of the instructions by the programmable processor causes the programmable processor to: in response to a request to perform an operation on data associated with a key: obtain a lock on the key; determine, based on a hash of the key, a page associated with the key, wherein: the page associated with the key is in a set of pages stored in a volume, and each respective page of the one or more pages stores a respective part of an array of slots; after obtaining the lock on the key, obtain a lock on the page associated with the key; after obtaining the lock on the page associated with the key: determine a slot associated with the key, wherein the part of the array of slots stored by the page associated with the key contains the slot associated with the key or contains keys used to determine the slot associated with the key; use the slot associated with the key to perform the operation on the data associated with the key, wherein the operation is a get operation, a put operation, or a delete operation; and release the lock on the page associated with the key and the lock on the key.

Other examples of this disclosure include computing systems comprising processors configured to perform such methods and computer-readable storage media comprising instructions for performing such methods.

The details of one or more examples are set forth in the accompanying drawings and the description below. Other features, objects, and advantages of the invention will be apparent from the description and drawings, and from the claims.

DETAILED DESCRIPTION

Figure 1:
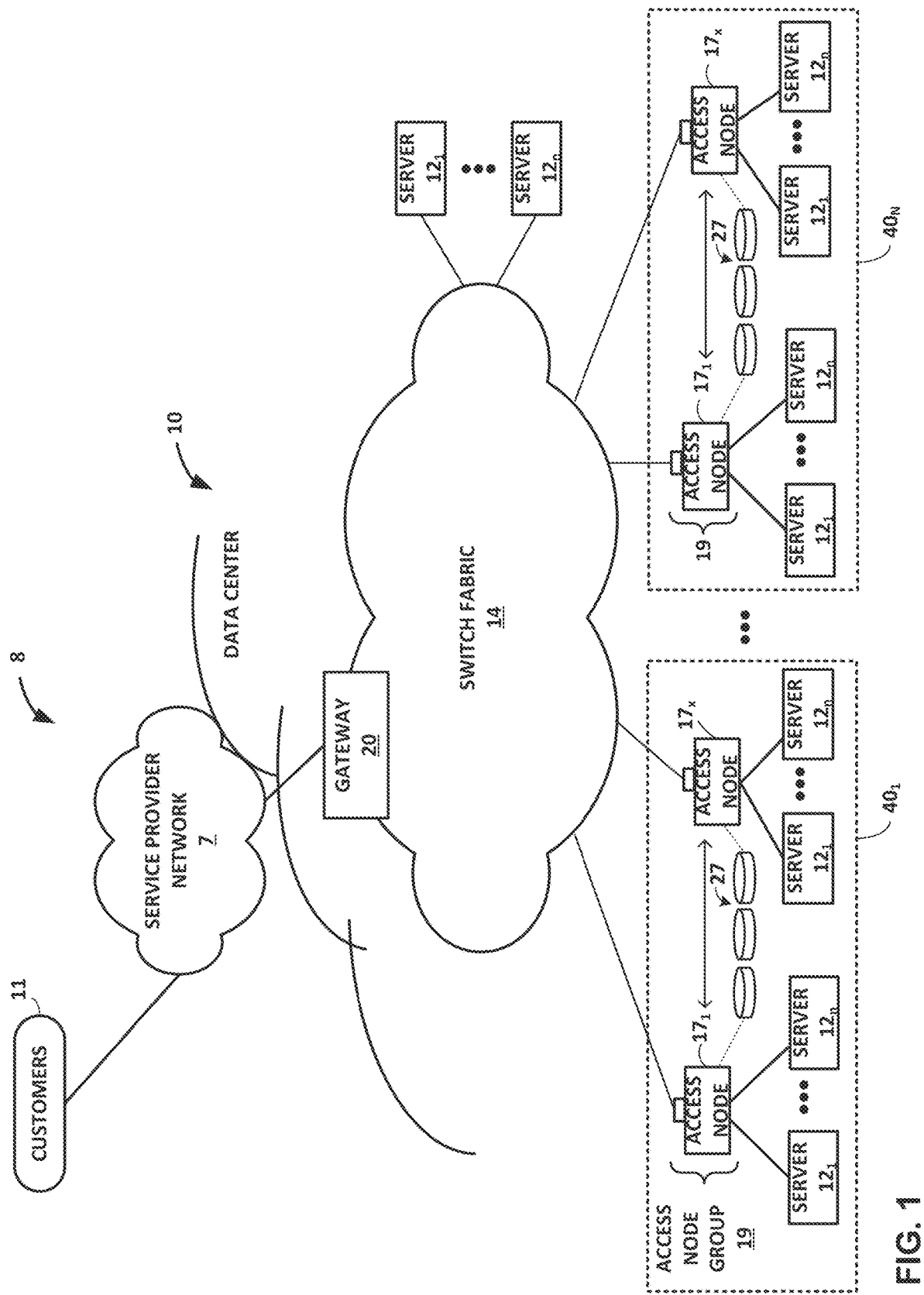
FIG. 1 is a block diagram illustrating an example network having a data center in which examples of the techniques described herein may be implemented.

FIG. 1 is a block diagram illustrating an example system 8 having a data center 10 in which examples of the techniques described herein may be implemented. In general, data center 10 provides an operating environment for applications and services for customers 11 coupled to the data center by content/service provider network 7 and gateway device 20. In other examples, content/service provider network 7 may be a data center wide-area network (DC WAN), private network or other type of network. Data center 10 may, for example, host infrastructure equipment, such as compute nodes, networking and storage systems, redundant power supplies, and environmental controls. Content/service provider network 7 may be coupled to one or more networks administered by other providers and may thus form part of a large-scale public network infrastructure, e.g., the Internet.

In some examples, data center 10 may represent one of many geographically distributed network data centers. In the example of FIG. 1, data center 10 is a facility that provides information services for customers 11. Customers 11 may be collective entities such as enterprises and governments or individuals. For example, a network data center may host web services for several enterprises and end users. Other exemplary services may include data storage, virtual private networks, file storage services, data mining services, scientific- or super-computing services, and so on.

In this example, data center 10 includes a set of storage systems and application servers 12 interconnected via a high-speed switch fabric 14. In some examples, servers 12 are arranged into multiple different server groups, each including any number of servers up to, for example, n servers $12_1$-$12_n$. Servers 12 provide computation and storage facilities for applications and data associated with customers 11 and may be physical (bare-metal) servers, virtual machines running on physical servers, virtualized containers running on physical servers, or combinations thereof.

In the example of FIG. 1, software-defined networking (SDN) controller 21 provides a high-level controller for configuring and managing the routing and switching infrastructure of data center 10. SDN controller 21 provides a logically and in some cases physically centralized controller for facilitating operation of one or more virtual networks within data center 10 in accordance with one or more embodiments of this disclosure. In some examples, SDN controller 21 may operate in response to configuration input received from a network administrator.

Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In the example of FIG. 1, each of servers 12 is coupled to switch fabric 14 by an access node 17. As further described herein, in one example, each access node 17 is a highly programmable I/O processor specially designed for offloading certain functions from servers 12. In one example, each access node 17 includes a number of internal processor clusters, each including two or more processing cores and equipped with hardware engines that offload cryptographic, compression and decompression, and regular expression (RegEx) processing, data storage functions and networking operations. Furthermore, in accordance with one or more techniques of this disclosure, access units 17 may be configured to store and retrieve data from one or more key-value stores. Each access node 17 may include components for fully implementing and processing network and storage stacks on behalf of one or more servers 12. In addition, access nodes 17 may be programmatically configured to serve as a security gateway for its respective servers 12, freeing up the processors of the servers to dedicate resources to application workloads. In some example implementations, each access node 17 may be viewed as a network interface subsystem that implements full offload of the handling of data packets (with zero copy in server memory) and storage acceleration for the attached server systems. In one example, each access node 17 may be implemented as one or more application-specific integrated circuit (ASIC) or other hardware and software components, each supporting a subset of the servers.

Access nodes 17 may also be referred to as data processing units (DPUs), or devices including DPUs. In other words, the term access node may be used herein interchangeably with the term DPU. Additional example details of various example DPUs are described in U.S. Provisional Patent Application No. 62/559,021, filed Sep. 15, 2017, entitled "Access Node for Data Centers," and U.S. Provisional Patent Application No. 62/530,691, filed Jul. 10, 2017, entitled "Data Processing Unit for Computing Devices".

In example implementations, access nodes 17 are configurable to operate in a standalone network appliance having one or more access nodes. For example, access nodes 17 may be arranged into multiple different access node groups 19, each including any number of access nodes up to, for example, x access nodes $17_1$–$17_x$. As such, multiple access nodes 17 may be grouped (e.g., within a single electronic device or network appliance), referred to herein as an access node group 19, for providing services to a group of servers supported by the set of access nodes internal to the device. In other examples, each access node may be implemented as a component (e.g., electronic chip) within a device, such as a compute node, application server, storage server, and may be deployed on a motherboard of the device or within a removable card, such as a storage and/or network interface card.

In general, each access node group 19 may be configured to operate as a high-performance I/O hub designed to aggregate and process network and/or storage I/O for multiple servers 12. As described above, the set of access nodes 17 within each of the access node groups 19 provide highly-programmable, specialized I/O processing circuits for handling networking and communications operations on behalf of servers 12. In addition, in some examples, each of access node groups 19 may include storage devices 27, such as solid state drives (SSDs) and/or hard disk drives (HDDs), configured to provide network accessible storage for use by applications executing on the servers 12. In some examples, one or more of the SSDs may comprise non-volatile memory (NVM) or flash memory. Each access node group 19 including its set of access nodes 17 and storage devices 27, and the set of servers 12 supported by the access nodes 17 of that access node group 19 may be referred to herein as a network storage compute unit (NSCU).

In the example of FIG. 1, each access node 17 provides connectivity to switch fabric 14 for a different group of servers 12 and may be assigned respective IP addresses and provide routing operations for the servers 12 coupled thereto. As described herein, access nodes 17 provide routing and/or switching functions for communications from/directed to the individual servers 12. Access nodes 17 may interface with and utilize core switches within switch fabric 14 so as to provide full-mesh (any-to-any) interconnectivity such that any of servers 12 coupled to access nodes 17 may communicate packet data for a given packet flow to any other of the servers using any of a number of parallel data paths within the data center 10. In addition, access nodes 17 described herein may provide additional services, such as storage (e.g., integration of solid-state storage devices), security (e.g., encryption), acceleration (e.g., compression), I/O offloading, and the like. In some examples, one or more of access nodes 17 may include storage devices 27, such as high-speed solid-state drives or rotating hard drives, configured to provide network accessible storage for use by applications executing on the servers. Although not shown in FIG. 1, access nodes 17 may be directly coupled to each other, such as direct coupling between access nodes in a common access node group 19, to provide direct interconnectivity between the access nodes of the same group.

Storage devices 27 may store key-value stores. Access nodes 17 may use the key-value stores to store data, retrieve data, or perform other operations with respect to data that is paired with a key. In accordance with an example technique of this disclosure, in response to a request to perform an operation on data associated with a key, an access node (e.g., one of access nodes 17) may obtain a lock on the key. Furthermore, the access node may determine, based on a hash of the key and a total number of pages in a set of one or more pages, a page associated with the key. In this example, the page associated with the key is in the set of pages and each respective page of the one or more pages stores a respective part of an array of slots. In this example, after obtaining the lock on the key, obtaining a lock on the page associated with the key. Additionally, in this example, after obtaining the lock on the page associated with the key, the access node may determine a slot associated with the key, wherein the part of the array of slots stored by the page associated with the key contains the slot associated with the key or contains keys used to determine the slot associated with the key. The access node may also, in this example, use the slot associated with the key to perform the operation on the data associated with the key. In this example, the operation may a get operation, a put operation, a delete operation, or another type of operation. Furthermore, in this example, the access node may release the lock on the page associated with the key and the lock on the key.

More details on the data center network architecture and interconnected access nodes illustrated in FIG. 1 are available in U.S. patent application Ser. No. 15/939,227, filed Mar. 28, 2018, entitled "Non-Blocking Any-to-Any Data Center Network with Packet Spraying Over Multiple Alternate Data Paths,".

An example architecture of a data processing unit (DPU) of access nodes 17 is described below with respect to FIG. 2. With respect to the example, the architecture of the DPU may comprise a multiple core processor system that represents a high performance, hyper-converged network, storage, and data processor and input/output hub. The architecture of the DPU may be optimized for high performance and high efficiency stream processing. For example, by performing parallel decoding of variable length codewords, the example techniques may promote faster throughput as compared to serial decoding of variable length codewords, because the data compression/decompression accelerator unit can identify many codewords in parallel.

In general, a stream, also referred to as a data stream, may be viewed as an ordered, unidirectional sequence of computational objects that can be of unbounded or undetermined length. In a simple example, a stream originates in a producer and terminates at a consumer, is operated on sequentially, and is flow-controlled. In some examples, a stream can be defined as a sequence of stream fragments, each representing a portion of data communicated by a stream. In one example, a stream fragment may include a memory block contiguously addressable in physical address space, an offset into that block, and a valid length. Streams can be discrete, such as a sequence of packets received from a network, or continuous, such as a stream of blocks, words or bytes read from a storage device. A stream of one type may be transformed into another type as a result of processing. Independent of the stream type, stream manipulation requires efficient fragment manipulation. An application executing on one of access nodes 17 may operate on a stream in three example broad ways: the first is protocol processing, which includes operating on control information or headers within the stream; the second is payload processing, which involves significant accessing of the data within the stream; and third is some combination of both control and data access.

Stream processing is a specialized type of conventional general-purpose processing supporting specialized limitations with regard to both access and directionality. Processing typically only accesses a limited portion of the stream at any time, called a "window," within which it may access random addresses. Objects outside of the window are not accessible through a streaming interface. In contrast, general purpose processing views the whole memory as randomly accessible at any time. In addition, stream processing generally progresses in one direction, called the forward direction. These characteristics make stream processing amenable to pipelining, as different processors within one of access nodes 17 can safely access different windows within the stream.

As described herein, DPUs of access nodes 17 may process stream information by managing "work units." In general, a work unit (WU) is a container that is associated with a stream state and used to describe (i.e. point to) data within a stream (stored in memory) along with any associated meta-data and operations to be performed on the data. In the example of FIG. 1, streams of data units may dynamically originate within a peripheral unit of a DPU of one of access nodes 17 (e.g. injected by a networking unit, a host unit, or a solid state drive interface), or within a processor of the one of access nodes 17, in association with one or more streams of data, and terminate at another peripheral unit or another processor of the one of access nodes 17. Each work unit maintained by a data processing unit is associated with an amount of work that is relevant to the entity executing the work unit for processing a respective portion of a stream.

Stream processing is typically initiated as a result of receiving one or more data units associated with respective portions of the stream and constructing and managing work units for processing respective portions of the data stream. In protocol processing, a portion would be a single buffer (e.g. packet), for example. Within the DPU of access nodes 17, work units may be executed by processor cores, hardware blocks, I/O interfaces, or other computational processing units. For instance, a processor core of an DPU executes a work unit by accessing the respective portion of the stream from memory and performing one or more computations in accordance with the work unit. A component of the DPU may receive, execute or generate work units. A succession of work units may define how the access node processes a flow, and smaller flows may be stitched together to form larger flows.

For purposes of example, DPUs of or within each access node 17 may execute an operating system, such as a general-purpose operating system (e.g., Linux or other flavor of Unix) or a special-purpose operating system, that provides an execution environment for data plane software for data processing. Moreover, each DPU may be configured to utilize a work unit (WU) stack data structure (referred to as a 'WU stack' in a multiple core processor system. As described herein, the WU stack data structure may provide certain technical benefits, such as helping manage an event driven, run-to-completion programming model of an operating system executed by the multiple core processor system. The WU stack, in a basic form, may be viewed as a stack of continuation WUs used in addition to (not instead of) a program stack maintained by the operating system as an efficient means of enabling program execution to dynamically move between cores of the access node while performing high-rate stream processing. As described below, a WU data structure is a building block in the WU stack and can readily be used to compose a processing pipeline and services execution in a multiple core processor system. The WU stack structure carries state, memory, and other information in auxiliary variables external to the program stack for any given processor core. In some implementations, the WU stack may also provide an exception model for handling abnormal events and a 'success bypass' to shortcut a long series of operations. Further, the WU stack may be used as an arbitrary flow execution model for any combination of pipelined or parallel processing.

As described herein, access nodes 17 may process WUs through a plurality of processor cores arranged as processing pipelines within access nodes 17, and such processing cores may employ techniques to encourage efficient processing of such work units and high utilization of processing resources. For instance, a processing core (or a processing unit within a core) may, in connection with processing a series of work units, access data and cache the data into a plurality of segments of a level 1 cache associated with the processing core. In some examples, a processing core may process a work unit and cache data from non-coherent memory in a segment of the level 1 cache. The processing core may also concurrently prefetch data associated with a work unit expected to be processed in the future into another segment of the level 1 cache associated with the processing core. By prefetching the data associated with the future work unit in advance of the work unit being dequeued from a work unit queue for execution by the core, the processing core may be able to efficiently and quickly process a work unit once the work unit is dequeued and execution of the work unit is to commence by the processing core. More details on work units and stream processing by data processing units of access nodes are available in U.S. Provisional Patent Application No. 62/589,427, filed Nov. 21, 2017, entitled "Work Unit Stack Data Structures in Multiple Core Processor System," and U.S. Provisional Patent Application No. 62/625,518, entitled "EFFICIENT WORK UNIT PROCESSING IN A MULTICORE SYSTEM", filed Feb. 2, 2018.

Figure 2:
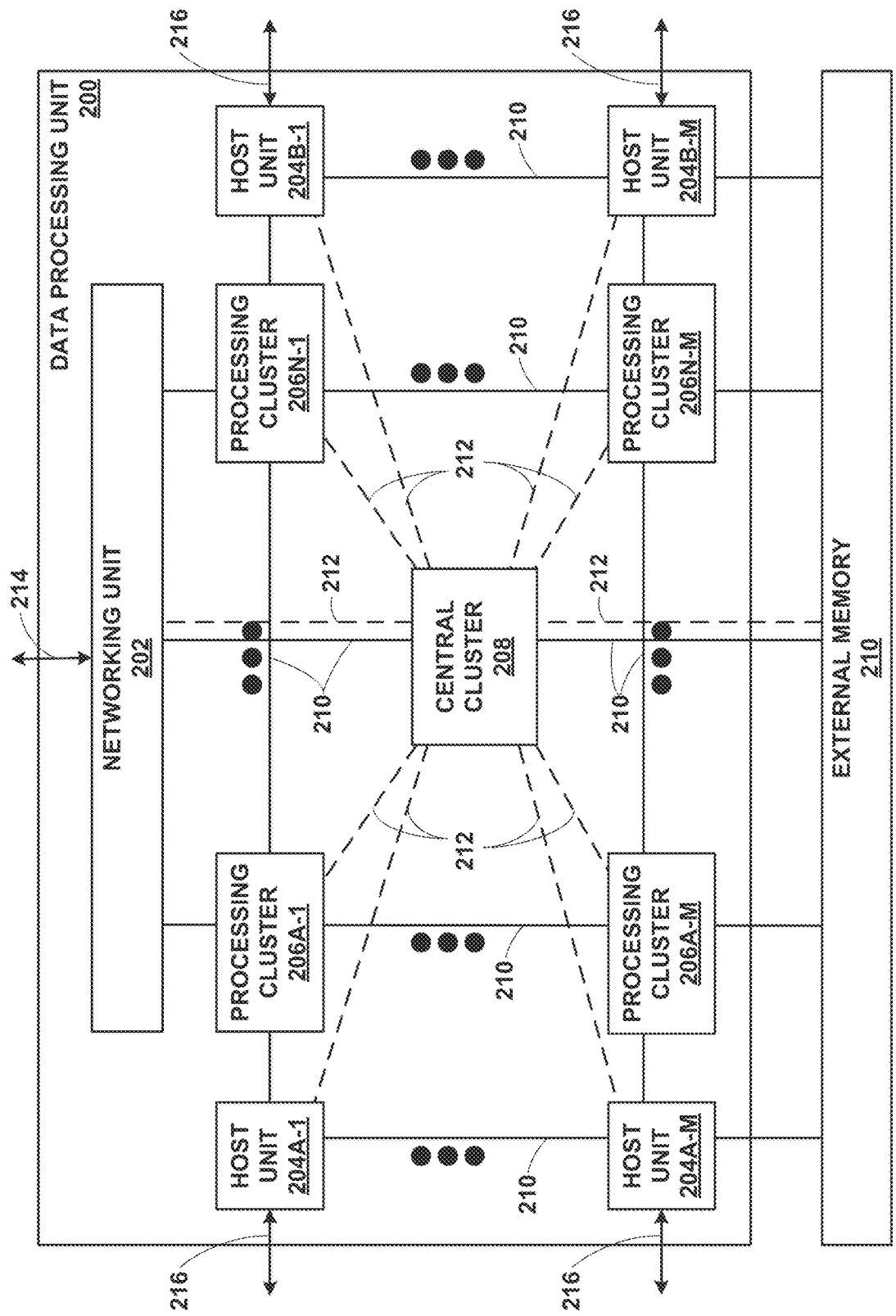
FIG. 2 is a block diagram illustrating an example data processing unit, in accordance with the techniques of this disclosure.

FIG. 2 is a block diagram illustrating one example of a data processing unit 200 including a networking unit, at least one host unit, and two or more processing clusters. Data processing unit 200 may operate substantially similar to any of the access nodes 17 of FIG. 1. Thus, data processing unit 200 may be communicatively coupled to a data center fabric (e.g., switch fabric 14), one or more server devices (e.g., servers 12), storage media (e.g., storage devices 27), one or more network devices, random access memory, or the like, e.g., via PCI-e, Ethernet (wired or wireless), or other such communication media in order to interconnect each of these various elements. Data processing unit 200 generally represents a hardware chip implemented in digital logic circuitry. As various examples, data processing unit 200 may be provided as an integrated circuit mounted on a motherboard of a computing device or installed on a card connected to the motherboard of the computing device.

In general, data processing unit 200 represents a high performance, hyper-converged network, storage, and data processor and input/output hub. As illustrated in FIG. 2, data processing unit 200 includes networking unit 202, host units 204A-1-204B-M (host units 204), processing clusters 206A-1-206N-M (processing clusters 206), and central cluster 208, and is coupled to external memory 210. Each of host units 204, processing clusters 206, central cluster 208, and networking unit 202 may include a plurality of processing cores, e.g., MIPS cores, ARM cores, PowerPC cores, RISC-V cores, or CISC or x86 cores. External memory 210 may comprise random access memory (RAM) or dynamic random access memory (DRAM).

As shown in FIG. 2, host units 204, processing clusters 206, central cluster 208, networking unit 202, and external memory 210 are communicatively interconnected via one or more specialized network-on-chip fabrics. A set of direct links 212 (represented as dashed lines in FIG. 2) forms a signaling network fabric that directly connects central cluster 208 to each of the other components of data processing unit 200, that is, host units 204, processing clusters 206, networking unit 202, and external memory 210. A set of grid links 210 (represented as solid lines in FIG. 2) forms a data network fabric that connects neighboring components (including host units 204, processing clusters 206, networking unit 202, and external memory 210) to each other in a two-dimensional grid.

Networking unit 202 may have Ethernet interfaces 214 to connect to the switch fabric, and interfaces to the data network formed by grid links 210 and the signaling network formed by direct links 212. Networking unit 202 provides a Layer 3 (i.e., OSI networking model Layer 3) switch forwarding path, as well as network interface card (NIC) assistance. One or more hardware direct memory access (DMA) engine instances (not shown) may be attached to the data network ports of networking unit 202, which are coupled to respective grid links 210. The DMA engines of networking unit 202 are configured to fetch packet data for transmission. The packet data may be in on-chip or off-chip buffer memory (e.g., within buffer memory of one of processing clusters 206 or external memory 210), or in host memory.

Host units 204 may each have PCI-e interfaces 216 to connect to servers and/or storage devices, such as SSDs or HDDs. This may allow data processing unit 200 to operate as an endpoint or as a root. For example, data processing unit 200 may connect to a host system (e.g., a server) as an endpoint device, and data processing unit 200 may connect as a root to endpoint devices (e.g., SSD devices). Each of host units 204 may also include a respective hardware DMA engine (not shown). Each DMA engine is configured to fetch data and buffer descriptors from host memory, and to deliver data and completions to host memory.

Although not shown, each of central cluster 208 and processing clusters 206 may include two or more processing cores and two or more hardware accelerators. In general, hardware accelerators perform acceleration for various data-processing functions, such as look-ups, matrix multiplication, cryptography, compression, regular expressions, or the like. That is, the hardware accelerators may comprise hardware implementations of lookup engines, matrix multipliers, cryptographic engines, compression engines, regular expression interpreters, or the like. In accordance with the disclosed techniques, the hardware accelerators may also perform acceleration for additional data reduction techniques beyond compression, including erasure coding and, in some cases, deduplication and thin provisioning.

Data processing unit 200 provides optimizations for stream processing. Data processing unit 200 executes an operating system that provides run-to-completion processing, which may eliminate interrupts, thread scheduling, cache thrashing, and associated costs. For example, an operating system may run on one or more of processing clusters 206. Central cluster 208 may be configured differently from processing clusters 206, which may be referred to as stream processing clusters. In general, central cluster 208 executes the operating system kernel (e.g., Linux kernel) as a control plane. Processing clusters 206 may function in run-to-completion thread mode of a data plane software stack of the operating system. That is, processing clusters 206 may operate in a tight loop fed by work unit queues associated with each processing core in a cooperative multi-tasking fashion.

Data processing unit 200 operates on work units. Work units are sets of data exchanged between processing clusters 206, networking unit 202, host units 204, central cluster 208, and external memory 210. Work units may associate a buffer with an instruction stream to eliminate checking overhead and allow processing by reference to minimize data movement and copy. The stream-processing model may structure access by multiple processors (e.g., processing clusters 206) to the same data and resources, avoid simultaneous sharing, and therefore, reduce contention. A processor may relinquish control of data referenced by a work unit as the work unit is passed to the next processor in line. Central cluster 208 may include a central dispatch unit responsible for work unit queuing and flow control, work unit and completion notification dispatch, and load balancing and processor selection from among processing cores of processing clusters 206 and/or central cluster 208. Software that executes on one of processing clusters or central cluster 208 to implement a work unit is referred to herein as a work unit handler (WUH). More details on work units and stream processing by access nodes are available in U.S. Provisional Patent Application No. 62/589,427, filed Nov. 21, 2017, entitled "Work Unit Stack Data Structures in Multiple Core Processor System,".

One or more of processing clusters 206 of data processing unit 200 may host a data plane for performing data storage operations on a durable block device (DBD) that provides persistent storage of data blocks with inline erasure coding enabled by the hardware accelerators of processing clusters 206. Management and control planes of the DBD may be hosted on one or more servers connected to data processing unit 200 via host units 204 or via networking unit 202. The data plane of the DBD hosted on the one or more of processing clusters 206 may communicate with the management plane and the control plane via a management agent and a control agent, respectively, hosted on central cluster 208 of data processing unit 200.

The data plane of the DBD hosted on the one or more of processing clusters 206 of data processing unit 200 may be divided into multiple layers of functionality from application (e.g., user volume) to device (e.g., SSD storage device). The disclosed techniques include a log structured logical volume layer in the data plane of the DBD that may enable performance of inline erasure coding.

The data plane of the DBD hosted on the one or more of processing clusters 206 of data processing unit 200 handles the work load of responding to data block read and write requests received via host units 204 from applications running on the servers. For example, when a write request for a hosted volume is received on one of PCI-e interfaces 216 of host units 204 from an application running on one of the servers, the receiving one of host units 204 generates a work unit to one of processing clusters 206. In response to the work unit, the one of processing clusters 206 performs the write request to the appropriate volume hosted by data processing unit 200. To perform the write request, the one of processing clusters 206 may propagate the work unit (or multiple work units) through the multiple functional layers of the storage stack, which may be hosted on different one of processing clusters 206 of data processing unit 200 or on different access nodes.

The control and management agents running on central cluster 208 of data processing unit 200 facilitate communication between the data plane of the DBD hosted on data processing unit 200 and the control and management planes of the DBD running on the servers. In general, the number of control and management agents is a very small fraction (e.g., 1%) of the number of data plane entities hosted on access nodes. As one example, central cluster 208 of data processing unit 200 may host a single control agent and a single management agent, while processing clusters 206 may host data planes for hundreds of DBD user volumes. Conversely, in other examples, central cluster 208 of data processing unit 200 may host multiple control and management agents as a larger fraction (e.g., 25% or 50%) of the number of data planes hosted on processing clusters 206, or even in a one-to-one relationship between control and management agents and data planes.

As mentioned above, access nodes 17 may store data in and retrieve data from a key-value store. From an API perspective, the key-value store is a type of access method in addition to Block access methods for directly storing and reading blocks of data. Both the key-value store and the Block access methods may be part of a set of control plane commands used to configure storage resources. From an implementation perspective, the key-value store may use devices that use block access methods for storing data objects (e.g., a directory, a large value store, etc.).

In the key-value store, discrete pieces of data (i.e., a value) are associated with corresponding keys. An access node may use the key associated with a value to retrieve the value. In general, a key is an identifier (e.g., number, string of bits, string of alphanumeric values, etc.). Typically, a key is smaller in size than the value associated with the key. Various types of values may be stored in a key-value store. For examples, the values may include pictures, videos, authentication credentials, webpage data, programming scripts, virtual machine images, documents, or other types of data.

Figure 3:
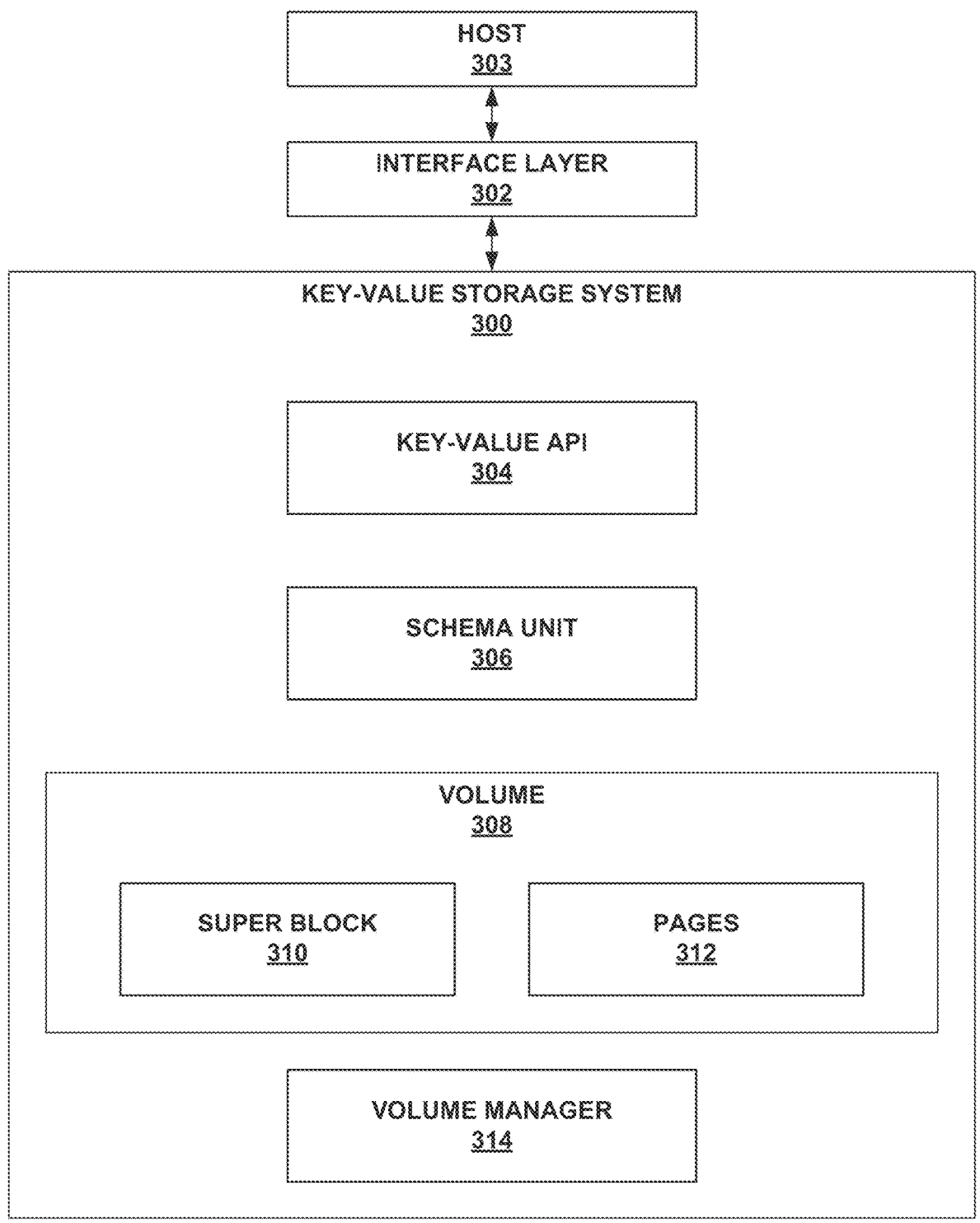
FIG. 3 is a block diagram illustrating an example software architecture of a key-value storage system, in accordance with one or more techniques of this disclosure.

FIG. 3 is a block diagram illustrating an example software architecture of a key-value storage system 300, in accordance with one or more techniques of this disclosure. In the example of FIG. 3, key-value storage system 300 comprises an interface layer 302, a key-value API 304, a schema unit 306, a volume 308, a super block 310, a set of one or more pages 312, and a volume manager 314. Volume 308 comprises a storage area that contains super block 310 and the set of one or more pages 312. Volume 308 may be implemented in external memory 210 (FIG. 2). Interface layer 302 may receive commands from a host 303 via a communication bus. In some examples, host 303 is a work unit handler (WUH). Key-value storage system 300 may execute commands received by interface layer 302 in a first-in-first-out fashion. A control plane may use volume manager 314 to create volumes. Volume manager 314 may also track and manage the volumes.

Key-value API 304 may implement an interface having operations for storing values in a key-value store and retrieving values for the key-value store. The operations may have parameters, such as keys, values, and so on. In some examples, Key-value API 304 may check and enforce parameter constraints. Schema unit 306 may implement hashing logic of mapping keys to slots in pages 312. Super block 310 may be stored at the start of volume 308 and may contain key configuration parameters and statistics for key-value storage system 300.

As noted above, volume 308 comprises a storage area that may contain super block 310 and pages 312. Volume 308 may be stored in a block volume, a durable block device. A block volume is a volume that may be read from and written to in units of a block (e.g., a set of bits). Super block 310 may contain key configuration parameters, a globally unique identifier (GUID) to uniquely identify volume 308, status fields, and other data. The configuration parameters may include one or more of a slot size, a page size, a number of pages, data regarding quality of service (QoS) requirements, data regarding encryption techniques, data regarding types of compression used in pages 312, data regarding durability, and so on. The status fields of super block 310 may record information such as whether a resize operation is in progress. The status fields may also record information such as periodically-captured statistics. Such statistics may include count operations, bytes transferred, space utilized, chain length, and so on.

Each of pages 312 may comprise a block of storage locations that may be read from or written to. In some examples, each of pages 312 has a configurable size. In some examples, the size of a page may be in a range of 4 KB to 64 KB. Each of pages 312 comprises a set of slots. Each slot is a set of storage locations within a page. In some examples, the slots are fixed size slots. Thus, in such examples, each of the slots in a page has the same size. Conceptually, a slot stores at least a key and value data. However, in some examples, slots may be stored in two separate pieces. In such examples, one of the pieces stores a key and another one of the pieces stores value data. The separation of a slot into the two separate pieces may allow for better cache line utilization when matching keys with slots in the page. For instance, the keys may be stored in a first set of consecutive memory locations and the data may be stored in a second set of consecutive memory locations. Thus, data in the first set of consecutive memory locations may be copied from a memory into a cache line such that a processor may quickly check the keys without needing to read the value data corresponding to the keys from the memory. The separation of slots may also enable input/output (I/O) optimization with larger page sizes.

In some examples, a slot contains a slot header and value data. The slot header of a slot contains a key associated with the slot. Additionally, the slot header of a slot may contain metadata associated with the slot. The metadata associated with the slot may include a reference count for the slot, a size of the value data (e.g., an uncompressed size of the value data), a compressed size of the value data, a timestamp, and/or other data associated with the slot. When a page is initialized, the reference count for the slot has a value (e.g., 0) indicating that there are no references to the slot. A slot is considered to be unused (i.e., empty) when there are no references to the slot. When the reference count for the slot indicates that there are one or more references to the slot, the slot is considered to used. The reference count for the slot may be incremented when a key-value pair is stored in the slot.

Furthermore, in some examples, each of pages 312 includes a respective page header. The page header of a page may include a globally unique identifier (GUID) that schema unit 306 may use used to detect whether the page has been initialized to be part of volume 308. In some examples, the page header of a page includes an error detection code for checking the integrity of the page. Example types of error detection code usable in the page of header of a page may include cyclic redundancy check (CRC) codes, repetition codes, parity bits, checksums, or other types of data usable to determine whether data in the page differs from data on which the error detection code was generated. In some examples, when schema unit 306 reads a page, schema unit 306 validates the GUID and the CRC. If the GUID is not set, the page is initialized. This allows lazy initialization of pages for an LVS store.

In accordance with a technique of this disclosure, a computing device may generate a command to perform an operation on data associated with a key. For example, a core within one of processing clusters 206 (FIG. 2) may generate the command as part of processing a work unit. The computing device may send the command to key-value storage system 300 via a bus, such as a PCIe bus. In examples where the bus is a PCIe bus, interface layer 302 may be implemented in accordance with a Non-Volatile Memory Host Controller Interface Specification (i.e., NVM Express (NVMe)). Furthermore, interface layer 302 may send responses on the communication bus.

The command may instruct key-value storage system 300 to perform various operations on the data associated with a key. For example, the operation may be a get operation that returns the data associated with the key. In another example, the operation may be a put operation that stores data associated with the key. In another example, the operation may be a delete operation that deletes data associated with the key.

Key-value API 304 implements a set of functions. Key-value storage system 300 may invoke functions implemented by key-value API 304 in response to commands received by interface layer 302. In some examples, key-value API 304 checks and enforces constraints on values of parameters of the commands. For example, key-value API 304 may enforce a constraint on the size of data store in key-value storage system 300.

Schema unit 306 may implement hashing logic for mapping keys to slots in pages 312. Functions implemented by key-value API 304 may use schema unit 306 to perform the operations on data associated with keys. For example, to perform a get operation to retrieve data associated with a key, schema unit 306 may apply a hashing algorithm to the key to obtain a hash value. Schema unit 306 may use the hash value to identify one of pages 312 as being associated with the key. After identifying one of pages 312 as being associated with the key, schema unit 306 may perform a slot checking operation. As part of performing the slot checking operation, schema unit 306 checks a slot in the page associated with the key. If the slot specifies the key, schema unit 306 may determine the data associated with the key based on value data stored in the slot. For instance, schema unit 306 may return the value data stored in the slot as the data associated with the key. In some examples, schema unit 306 may decompress the value data stored in the slot and return the decompressed data as the data associated with the key. However, if the slot does not specify the key, schema unit 306 may check the next slot in the page associated with the key. Because the slots are searched sequentially (i.e., linearly), this approach may be referred to as a linear hash table or a closed hash table. The process of checking slots in this way may be referred to as a linear probe. The probe size is a maximum number of slots that are allowed to be checked.

To perform the put operation to store data associated with a key, schema unit 306 may apply the hashing algorithm to obtain a hash value. Schema unit 306 may use the hash value to identify one of pages 312 as being associated with the key. After identifying one of pages 312 as being associated with the key, schema unit 306 may perform a slot checking operation. As part of performing the slot checking operation, schema unit 306 checks a slot in the page associated with the key. If the slot is unused, schema unit 306 stores the key and value data in the slot. In some examples, the value data stored in the slot may be the same as the data associated with the key. In some examples, the value data stored in the slot is a compressed version of the data associated with the key.

In some examples, synchronization is required to maintain schema consistency in the presence of concurrent operations that may affect the same key or two different keys on the same one of pages 312. For instance, in some such examples, key-value storage system 300 may use resource locks that can be held across WUHs to allow for asynchronous operations, such as page reads and page writes. In some examples, the resource locking model is integrated into a WUH model. Thus, processes of different WUHs may not hold locks on more than one resource at the same time. A critical section of an operation on the data associated with a key is a section of the operation that cannot be executed by more than one process at a time. In this disclosure, a process may be a unit of execution, such as a conventional process or thread. In examples where the resource locking model is integrated into the WUH model, a WUH that will perform the critical section is dispatched by a requesting work unit once the lock has been acquired by a work unit generated by the requesting work unit. When a lock is contended, a work unit for requesting the resource may be enqueued on a WUH stack until the resource is available. To avoid memory contention, operations (lock/unlock) on resource locks are bound to virtual processors based on a hashing scheme. For instance, a hashing scheme may be used to distribute work for acquiring locks to virtual processors on different hardware threads.

In accordance with a technique of this disclosure, operations that affect that data in volume 308 use resource locks for keys and pages 312. To prevent deadlocks, there are two rules:

1. Lock ordering: Key followed by page
2. Single lock: only a single key and/or page lock can be held at any time. The locking behavior for the various operations are detailed elsewhere in this disclosure.

As noted above, schema unit 306 may perform a slot checking operation that checks slots. The responsiveness of key-value storage system 300 may decrease in proportion to the average number of slots that schema unit 306 checks when performing a slot checking operation. To avoid having to check an excessively high average number of slots, schema unit 306 may perform a resize operation that increases the number of pages 312. For instance, the resize operation may double the number of pages 312. Furthermore, when performing the resize operation, schema unit 306 may move content (e.g., keys and value data) from particular slots in previously-existing pages to slots in the newly-added pages. This may have the effect of reducing the average number of slots that schema unit 306 checks during a slot checking operation. When schema unit 306 moves content of a slot from a first page to a second page as part of a resize operation, schema unit 306 may mark the slot in the first page with a "tombstone" to indicate that the content of the slot in the first page is no longer current and can be replaced. Marking the slot in the first page with a "tombstone" is essentially a delete operation. The delete operation also uses a "tombstone" to mark a deleted slot. This may ensure that a linear probe is not prematurely terminated due to a delete. In some examples, a background thread performs the resize operation.

Furthermore, in some examples, if any put operation fails as the background resize thread has not processed that page yet, the put operation may dispatch a priority resize request to resize a region in which the failure happens. The region may be a maximum set of slots allowed to be checked in a linear probe of the slots. In some examples, a bitmap is used to track which pages have been resized. Thus, if a process that is resizing the key-value store reaches a page that has already been resized (e.g., because of a priority resize request), the process may skip resizing of that page. This resizing process may allow other operations (e.g., get, put, delete operations) to occur while the resizing process is ongoing. In other words, it is not necessary for the resize process to be completed prior to applying get, put, or delete operations to the key-value store.

Key-value storage system 300 may be configured in various ways. For example, volume 308 may be configured via a management and control plane of data center 10 (FIG. 1). In some examples, a top-level specification from a management console (e.g., Openstack Cinder) includes parameters of slot size, page size, size of key-value storage system 300, quality of service (QoS), encryption, compression, durability (e.g., a replication factor or erasure coding scheme). In general, durability refers to how recoverable the data is after a failure. For instance, the higher the data replication factor (number of extra copies stored in other places) the higher the durability; similar with erasure coding scheme that determines the amount of redundant data/parity bits used. The size of key-value storage system 300 may indicate a total number of pages in key-value storage system 300. The page size indicates a size of each of pages 312. In some examples, the page size must be a power of 2. The slot size indicates a size of slots in pages 312. In some examples, the slot size must be a power of 2. The slot size must be smaller than the page size. Furthermore, the maximum size of value data in a slot must be smaller than the slot size. The maximum size of value data in a slot may be calculated based on the size of overhead of page headers and slot headers. Other parameters may include a maximum chain length (i.e., probe size). The maximum chain length specifies a maximum number of slots that can be part of a hash chain. A hash chain is a series of slots checked in order to find a slot that is associated with a particular key. The maximum chain length limits the number of page read/write requests required to service a slot before it is more useful to resize volume 308.

Figure 4:
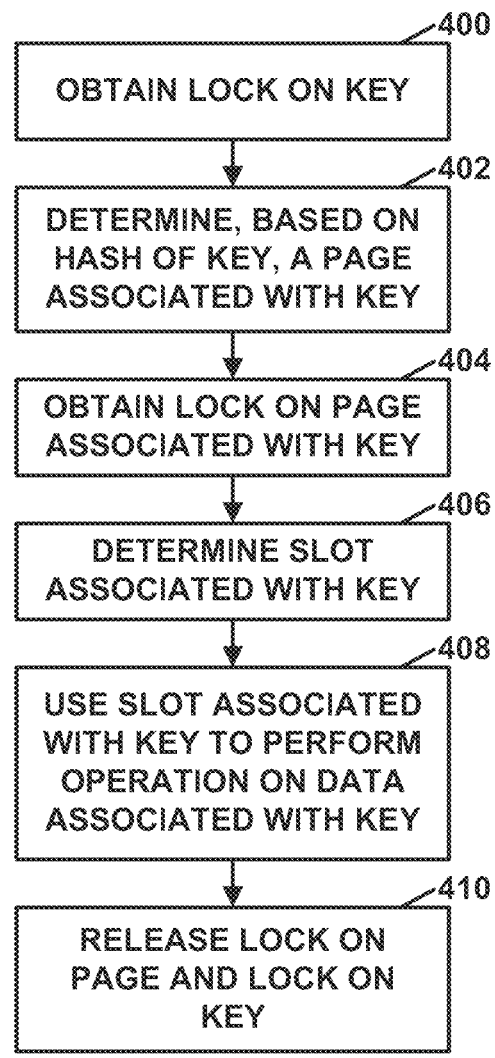
FIG. 4 is a flowchart illustrating an example synchronization process of a key-value store, in accordance with one or more techniques of this disclosure.

FIG. 4 is a flowchart illustrating an example synchronization process of key-value storage system 300, in accordance with one or more techniques of this disclosure. The flowcharts of this disclosure are provided as examples. In other examples of this disclosure, operations may be performed in different orders, in parallel, or more include more, fewer, or different actions.

In the example of FIG. 4, in response to a request to perform an operation on data associated with a key, key-value storage system 300 may obtain a lock on the key (400). Next, key-value storage system 300 may determine, based on a hash of the key, a page associated with the key (402). The page associated with the key is in the set of one or more pages. Key-value storage system 300 may determine the page associated with the key in various ways. For example, key-value storage system 300 may apply a hashing algorithm (e.g., SHA-256) to generate an initial hash value. In this example, key-value storage system 300 may determine a final hash value as "a mod b", where "a" is the initial hash value and "b" is the number of pages in the set of one or more pages. Furthermore, in this example, key-value storage system 300 may determine the page associated with the key based on the final hash value. For example, key-value storage system 300 may use a look up table that maps final hash values to memory addresses of pages to determine the page associated with the key. In another example, key-value storage system 300 may multiply the final hash value by a page size value and may add the result to a memory address of a first page to determine a memory address of the page associated with the key. Each respective page of the one or more pages stores a respective part of an array of slots.

After obtaining the lock on the key, key-value storage system 300 obtains a lock on the page associated with the key (404). After obtaining the lock on the page associated with the key, key-value storage system 300 determines a slot associated with the key (406). The part of the array of slots stored by the page associated with the key may contain the slot associated with the key or may contain keys used to determine the slot associated with the key. For instance, key-value storage system 300 may check keys in the page associated with the key for a slot that specifies the key, and if none of the slots in the page associated with the key specify the key, key-value storage system 300 may release the lock on the page associated with the key, obtain a lock on a next page of the set of pages, and after obtaining the lock on the next page of the set of pages, check slots in a next page of the set of pages.

Furthermore, key-value storage system 300 may use the slot associated with the key to perform the operation on the data associated with the key (408). The operation may be a get operation, a put operation, a delete operation, or another type of operation. Examples of how key-value storage system 300 may perform get operations, put operations, delete operations, and other operations are found throughout this disclosure.

After using the slot associated with the key to perform the operation on the data associated with the key, key-value storage system 300 releases the lock on the page and the lock on the key (410). For instance, key-value storage system 300 may release the lock on the page associated with the key and then release the lock on the key.

As noted above, the operation on the data associated with the key may be a put operation. In one example consistent with the operation of FIG. 4, the put operation may include the following steps:

TABLE 1

1. Lock key. This prevents any other operations on the same key.
2. Page = Hash(key).
3. Acquire page lock. This also reads the page from memory (e.g., Flash memory) if required (i.e. not in the cache or already being operated on).
4. Loop across the slots in the page.
   (1) If a key match is found, increment reference count.
   (2) If the end of the chain is found, insert the entry.
   (3) If all the chain spans over to the next page, release the lock on this page and acquire a lock on the next page. Repeat Step 4.
5. Unlock Key.

Thus, in the example of FIG. 4, when the operation is the put operation, key-value storage system 300 may, as part of using the slot associated with the key to perform the operation on the data associated with the key, key-value storage system 300 may store value data in the slot associated with the key. The value data stored in the slot associated with the key may be based on the data associated with the key. For instance, the value data may be a compressed version of the data associated with the key. In other instances, the value data may be the same as the data associated with the key. Furthermore, the page associated with the key may be considered a first page in the set of pages and, as part of determining the slot associated with the key, key-value storage system 300 may check slots in the first page for an unused slot. Based on none of the checked slots in the first page being an unused slot, key-value storage system 300 may obtain a lock on a second, different page in the set of pages and check one or more slots in the second page for an unused slot. Key-value storage system 300 may then determine that the unused slot in the second page is the slot associated with the key. After storing the value data in the slot associated with the key, key-value storage system 300 may release the lock on the second page. Key-value storage system 300 may release the lock on the first page in response to determining that none of the checked slots in the first page stores the key.

In one example, when a resize operation is in progress, the put operation first attempts to find an existing slot in the first half of the key-value store (i.e., in a page that existed in the key-value store prior to the start of the resize operation). In this example, if schema unit 306 finds a tombstone in a slot during scan, schema unit 306 may record the index of the slot. If schema unit 306 reaches the end of the chain (e.g., schema unit 306 reaches the end of the page without finding an unused slot), schema unit 306 may go back and attempt to fill the slot with value data based on the data associated with the key.

The operation on the data associated with the key may be a get operation. In one example consistent with the operation of FIG. 4, the get operation may include the steps in Table 2, below:

TABLE 2

1. Lock Key. This prevents any other operations on the same Key. In some examples, this Read/Write lock may allow concurrent GET request. In other examples, only a single reader may find the slot and have a result cache for it if needed.
2. Page = Hash(Key).
3. Acquire Page Lock. This also reads the page from memory if required (i.e. not in the Cache or already being operated on).
4. Loop across the slots in the page.
    (1) If a key match is found, return the value associated with the key.
    (2) If the end of the chain is found, return "not found".
    (3) If all the chain spans over to the next page, release the lock on this page and acquire a lock on the next page. Repeat Step 4.
5. Unlock Key.

Thus, in the example of FIG. 4, when the operation is the get operation, key-value storage system 300 may, as part of using the slot associated with the key to perform the operation on the data associated with the key, key-value storage system 300 may determine, based on value data stored in the slot associated with the key, the data associated with the key. For instance, the value data may be a compressed version of the data associated with the key. In other examples, the value data may be the same as the data associated with the key. In such examples, determining the data associated with the key may simply comprise reading the value data from the slot associated with the key. After determining the data associated with the key, key-value storage system 300 may return the data associated with the key.

Furthermore, in examples where the operation is the get operation, the page associated with the key may be considered a first page in the set of pages and, as part of determining the slot associated with the key, key-value storage system 300 may check slots in the first page for a slot that stores the key. Based on none of the checked slots in the first page storing the key, key-value storage system 300 may obtain a lock on a second, different page in the set of pages. Additionally, key-value storage system 300 may check one or more slots in the second page for a slot that stores the key. Key-value storage system 300 may determine that a slot in the second page that stores the key is the slot associated with the key. After returning the data associated with the key, key-value storage system 300 may release the lock on the second page. Key-value storage system 300 may release the lock on the first page in response to determining that none of the checked slots in the first page stores the key.

In one example, when a resize operation is in progress, the get operation may attempt to find the slot associated with the key in the first half of the array of slots if the slot associated with the key is not found based on a new hash of the key. For example, if key-value storage system 300 determines that the page associated with the key is in the set of newly-added pages, key-value storage system 300 may first attempt to find the slot associated with the key in the newly-added page. However, because the content of the slot associated with the key may not yet have been moved to the newly-added page associated with the key, key-value storage system 300 may check the page previously associated with the key for the slot associated with the key.

When the operation is the delete operation, key-value storage system 300 may apply logic similar to that of the get operation to locate the slot associated with the key. For instance, if key-value storage system 300 finds a slot that specifies the key, key-value storage system 300 marks the slot as "free" if the slot is at the end of preceding chains (i.e., if the next slot is free). Otherwise, key-value storage system 300 may mark the slot as a "tombstone" entry that can no longer match a key, but allows the chains to remain intact. Tombstone entries can be reclaimed by various operations, e.g., by a put operation or a resize operation.

Figure 5:
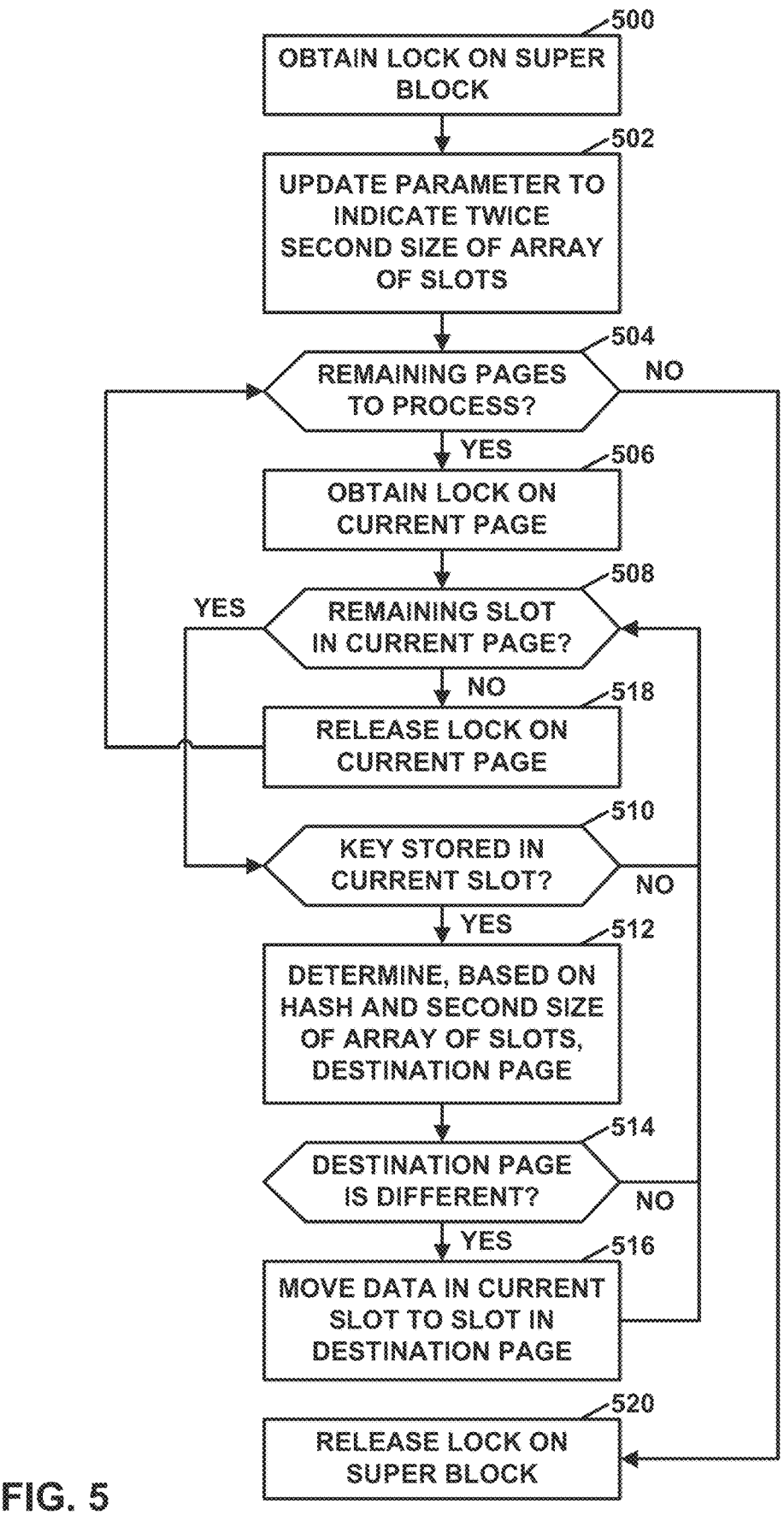
FIG. 5 is a flowchart illustrating an example operation to resize a key-value store, in accordance with a technique of this disclosure.

FIG. 5 is a flowchart illustrating an example operation to resize a key-value store, in accordance with a technique of this disclosure. In the example of FIG. 5, key-value storage system 300 may obtain a lock on super block 408 (500). Volume 308 may comprise a page associated with a key and super block 310 may contain a parameter indicating a first size of the array of slots. After obtaining the lock on super block 310, key-value storage system 300 may update the parameter to indicate a second size of the array of slots (502). The second size is greater than the first size of the array of slots. For example, the second size may be twice the first size.

Additionally, key-value storage system 300 may determine whether there are remaining pages to process (504). If key-value storage system 300 determines that there is a remaining page to process, the next page to process is referred to herein as the current page. In response to determining that there are one or more remaining pages to process ("YES" branch of 504), key-value storage system 300 may obtain a lock on the current page (506). After obtaining the lock on the current page, key-value storage system 300 may determine whether there are any remaining slots in the current page to process (508). If key-value storage system 300 determines that there is a remaining slot in the current page to process, the next slot to process is referred to herein as the current slot. In response to determining that there is at least one remaining slot in the current page ("YES"

branch of 508), key-value storage system 300 may determine whether there is a key stored in the slot (510).

In response to determining that a key is stored in the current slot ("YES" branch of 510), key-value storage system 300 may determine, based on a hash of the key stored in the current slot and the second size of the array of slots, a destination page in the set of pages (512). For example, key-value storage system 300 may determine an initial hash value by applying a hashing algorithm (e.g., SHA-256) to the key stored in the current slot and then calculating c=a mod b, where a is the initial hash value and b is the number of pages when the array of slots has the second size. In this example, key-value storage system 300 may use c to determine a location of the destination page. For instance, c may be an index of the destination page which may be used to look up a memory location of the destination page.

In addition, key-value storage system 300 may determine whether the destination page is different from the current page (514). In response to determining that the destination page is different from the current page ("YES" branch of 514), key-value storage system 300 may move data in the current slot (including a slot header and value data in the current slot) from the current page to a slot in the part of the array stored in the destination page (516). For example, key-value storage system 300 may move the data in accordance with any of the examples described elsewhere in this disclosure for moving the data. The operation of moving the data in the current slot may be implemented by releasing the lock on the current page, invoking a put operation to store the data in the key-value storage system 300 (which will automatically store the data in the destination page), and invoking a delete operation to delete the data in the current page.

After moving the data in the current slot and reobtaining a lock on the current page, or in response to determining that the destination page is not different from the current page ("NO" branch of 514), or in response to determining that no key is stored in the current slot ("NO" branch of 510), key-value storage system 300 may determine whether there are any remaining slots in the current page (508). If there are remaining slots in the current page, key-value storage system 300 may perform actions (510)-(516) with respect to another slot of the current page. In this way, key-value storage system 300 may perform actions (510)-(516) for each respective slot in the part of the array of slots stored in the current page.

In response to determining that there are no remaining slots in the current page ("NO" branch of 508), key-value storage system 300 may release the lock on the current page (518). Additionally, key-value storage system 300 may again determine whether there are any remaining pages to process (504). If there are remaining pages, key-value storage system 300 may perform actions (506)-(516) with respect to another page. In this way, key-value storage system 300 may perform actions (506)-(516) for each respective page in the set of pages 312. However, in response to determining that there are no remaining pages to process in the set of pages ("NO" branch of 504), key-value storage system 300 may release the lock on the super block (520).

Hence, in the example of FIG. 5, volume 308 may comprise a page associated with a key and a super block 310 that contains a parameter indicating a first size of the array of slots. Key-value storage system 300 may obtain a lock on the super block. After obtaining the lock on the super block, key-value storage system 300 may update the parameter to indicate a second size of the array of slots greater than the first size of the array of slots. For each respective page of the one or more pages, key-value storage system 300 may obtain a lock on the respective page. After obtaining the lock on the respective page, key-value storage system 300 may, for each respective slot in the part of the array of slots stored in the respective page, in response to determining that a key is stored in the respective slot, determine, based on a hash of the key stored in the respective slot and the second size of the array of slots, a destination page in the set of pages. Based on the destination page being different from the respective page, key-value storage system 300 may release the lock on the respective page and, after releasing the lock on the respective page, move data in the respective slot from the respective page to a slot in the part of the array stored in the destination page. In this example, as part of moving the data in the respective slot, key-value storage system 300 may obtain a lock on the key stored in the respective slot. Additionally, key-value storage system 300 may determine whether the key is still stored in the respective slot. Based on the key still being stored in the respective slot, key-value storage system 300 may perform the put operation to store the data in the respective slot at the slot in the part of the array stored in the destination page. Additionally, based on the key still being stored in the respective slot, key-value storage system 300 may perform the delete operation with respect to the respective slot. Key-value storage system 300 may then release the lock on the key stored in the respective slot.

In this way, in FIG. 5, key-value storage system 300 may implement the following algorithm for resizing the key-value store:

TABLE 3

1. Lock super block 310.
2. Ensure that there is no resize operation already in progress.
3. Update super block 310 with the new parameters.
4. Unlock super block 310.
5. Iterate over each page of in the first half of a table of pages (i.e. previous size of the table).
6. Acquire Page Lock. This also reads the page from memory if required (i.e. not in the cache or already being operated on).
7. Loop across the slots in the page.
   (1) If a slot is used and its key hashes to the second half of the table, copy the slot. Release the page and attempt to relocate the slot (see below). The page lock may need to be released here so that key-value storage system 300 can lock the key first to follow the lock order.
   (2) If no more entries are to be rehashed, release this page and acquire the next one. Repeat Step 7.
8. Mark the resize as complete by updating the super block 310.

Furthermore, the process of moving data from the current slot to a slot in a destination page may be implemented according to the pseudocode in Table 4, below:

TABLE 4

1. Lock key corresponding to the slot to be rehashed.
2. Re-lookup the slot in its old location to ensure that it was not deleted while we released locks. This is similar to the a normal get operation, except that key-value storage system 300 has already found the location.
3. Put the slot according to its new hash. This is similar to a normal put operation except that key-value storage system 300 also copies the existing metadata (e.g. reference count, content of a slot header, etc.).
4. Delete the old slot. This is similar to a normal delete operation, except that key-value storage system 300 has already found the location.
5. Unlock key In some examples, it may be more efficient for key-value storage system 300 to encrypt each slot separately because key-value storage system 300 only performs the computation of the data being modified. In some examples, key-value storage system 300 performs encryption at the level of an underlying block device. In this context, a block device may be similar to a stacking when the key-value storage system is implemented by host software. A host may regard a block device as a device from which data can be read from and written to in units of blocks. For a remote IKV volume, key-value storage system 300 can do the remote access using the underlying block volume or at the API level. The latter may keep housekeeping inputs and outputs (IOs) (e.g. rehash) local to a data processing unit chip, whereas the former may be somewhat simpler to implement and may be consistent with the stacking for a Durable Volume. In some examples, as a baseline, the underlying Block Volume is relied upon for managing snapshots. A snapshot creates a temporary read-only device that can be copied to another device or object. In some examples, key-value storage system 300 uses the timestamp in the slot header of a slot to detect presence of the slot in a given snapshot.

In some examples, key-value storage system 300 may perform a resize operation in a single shot and does not write two pages in order to move a record (i.e., the data in a slot). To do so, key-value storage system 300 may use a logic index lock that prevents other processes from accessing any page associated with a particular page index. Note that during a resize process, a particular page index generated by hashing a key may correspond to the original page and a new page. Thus, in this example, key-value storage system 300 may read records from the source page and write all records of the source page to the new page. Key-value storage system 300 may then go through the slots in the new page and delete keys that do not belong in the new page. Similarly, key-value storage system 300 may scan through the slots in the original page and delete keys that do not belong in the source page.

Figure 6:
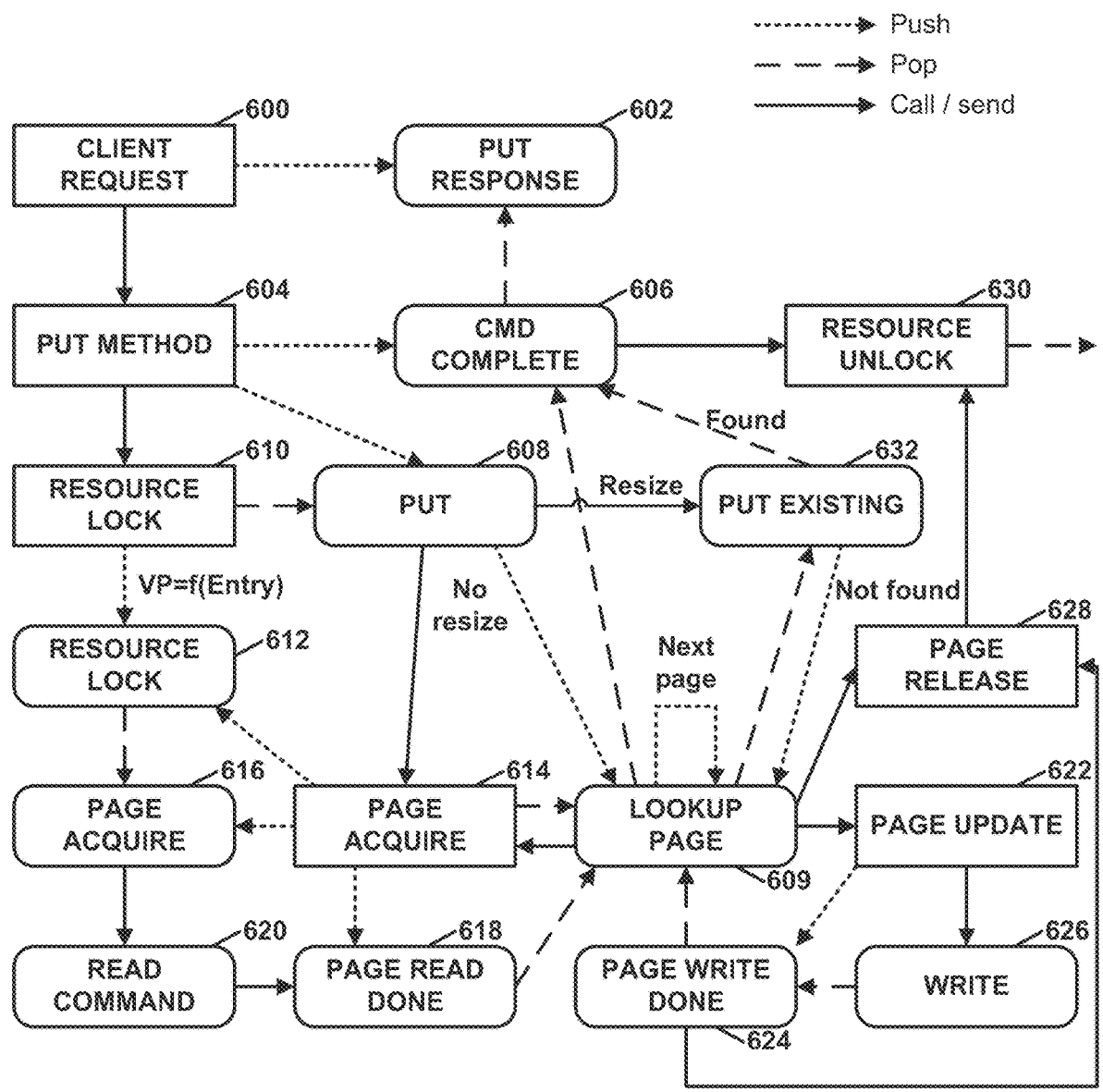
FIG. 6 is a flow diagram illustrating example work unit handler (WUH) flow for a put operation, in accordance with one or more techniques of this disclosure.

FIG. 6 is a flow diagram illustrating example WUH flow for a put operation, in accordance with one or more techniques of this disclosure. In some examples, a put operation takes as parameters a key and data associated with the key. In the example of FIG. 6, a cluster manager (e.g., central cluster 208 (FIG. 2) may use a work unit stack to manage work units used to perform the put operation. When the cluster manager "pops" a work unit from the stack, the cluster manager may deliver the work unit to a hardware thread or a virtual processor of one of the DPUs. A processor (e.g., a DPU) may execute a work unit upon the work unit being popped off the work unit stack to completion. In FIG. 6, rounded rectangles correspond to work units and square-cornered rectangles correspond to methods in an API.

As shown in the example of FIG. 6, a client 600 (such as host 303 (FIG. 3)) may first push a "put response" work unit 602 onto a work unit stack. The "put response" work unit 602 ultimately handles providing a put response to client 600. Additionally, client 600 invokes a put method 604 of key-value API 304 (FIG. 3) to perform the put operation. Put method 604 in turn may push a "command complete" work unit 606 onto the stack. Additionally, put method 604 may push a "put" work unit 608 onto the stack. The "put" method 604 also invokes a resource lock method 610 to obtain a lock on a key. The resource lock method 610 may pop the "put" work unit 608 off the stack in response to obtaining a lock on the key. Additionally, resource lock method 610 may push a "resource lock" work unit 612 onto the stack.

Upon being popped from the stack, the "put" work unit 608 may determine a page index based on a hash of the key. Additionally, the "put" work unit 608 may determine whether a resize operation is underway. If no resize operation is underway, the "put" work unit 608 may push a "lookup page" work unit 609 onto the stack. Additionally, the "put" work unit 608 may invoke a "page acquire" method 614 to obtain a lock on the page identified by the page index. The "page acquire" method 614 may push a second instance of the "resource lock" work unit 612 onto the stack. The second instance of the "resource lock" work unit 612 may attempt to attain a lock on the page associated with the page index. Additionally, the "page acquire" method 614 pushes a "page acquire" work unit 616 onto the stack. The "page acquire" work unit 616 handles events happening when a lock on the page associated with the key is obtained. Thus, when the second instance of the "resource lock" work unit 612 acquires a lock on the page associated with the page index, the second instance of the "resource lock" work unit 612 pops the "page acquire" work unit 616 from the stack. Furthermore, the "page acquire" work unit 614 pushes a "page read done" work unit 618 onto the stack. The "page read done" work unit 618 handles events happening after a page is read.

In response to being popped from the stack, the "page acquire" work unit 616 may invoke a read command 620 of volume manager 314 to read data from the page associated with the page index. After the page associated with the page index is read, read command 620 may pop the "page read done" work unit 618 from the stack. Upon receiving the read data for the page, the "page read done" work unit 618 may pop the "lookup page" work unit 609 from the stack.

In response to being popped from the stack, the "lookup page" work unit 609 may determine whether a slot associated with the key is in the read page. For instance, the "lookup page" work unit 609 may scan through slots of the read page to determine whether any of the slots specify the key. If not, the "lookup page" work unit 609 may invoke the "page acquire" method 614 for a next page of the key-value store and push another instance of the "lookup page" work unit 609 onto the stack. The process described above for the "page acquire" method 614 may then repeat. However, if the slot associated with the key is in the read page or is added to the read page, the "lookup page" work unit 609 may invoke a "page update" function 622.

The "page update" function 622 may, in response to being invoked, push a "page write done" work unit 624 onto the stack and may invoke a write command 626 of volume manager 314 to write data to the slot associated with the key. Once the write command 626 has finished writing the data to the slot associated with the key, the write command 626 may pop the "page write done" work unit 624 from the stack. The "page write done" work unit 624 may then invoke the "page release" function.

The "lookup page" work unit 609 may then invoke a "page release" function 628. The "page release" function 628 may in turn invoke a "resource unlock" function 630 to unlock the page. Furthermore, the "lookup page" work unit 609 may pop the "command complete" work unit 606 from the stack. In response to being popped from the stack, the "command complete" work unit 606 may pop the "put response" work unit 602 from the stack. Additionally, the "command complete" work unit 606 may invoke the "resource unlock" method 630 to release the lock on the key. Resource unlock method 630 may pop from the stack a work unit waiting for a lock on the key or page. Upon being popped from the stack the "put response" work unit 602 may return an indication that the put operation is complete to the client.

If a resize operation is underway, the "put" work unit 608 may push a "put existing" work unit 632 onto the stack. The "put existing" work unit 632 first attempts the normal PUT sequence in the previous hash space (prior to resize). If found, the "put existing" work unit 632 increments the reference count and is done. If not found, the "put existing" work unit 632 repeats the normal put operation using the new hash space.

Figure 7:
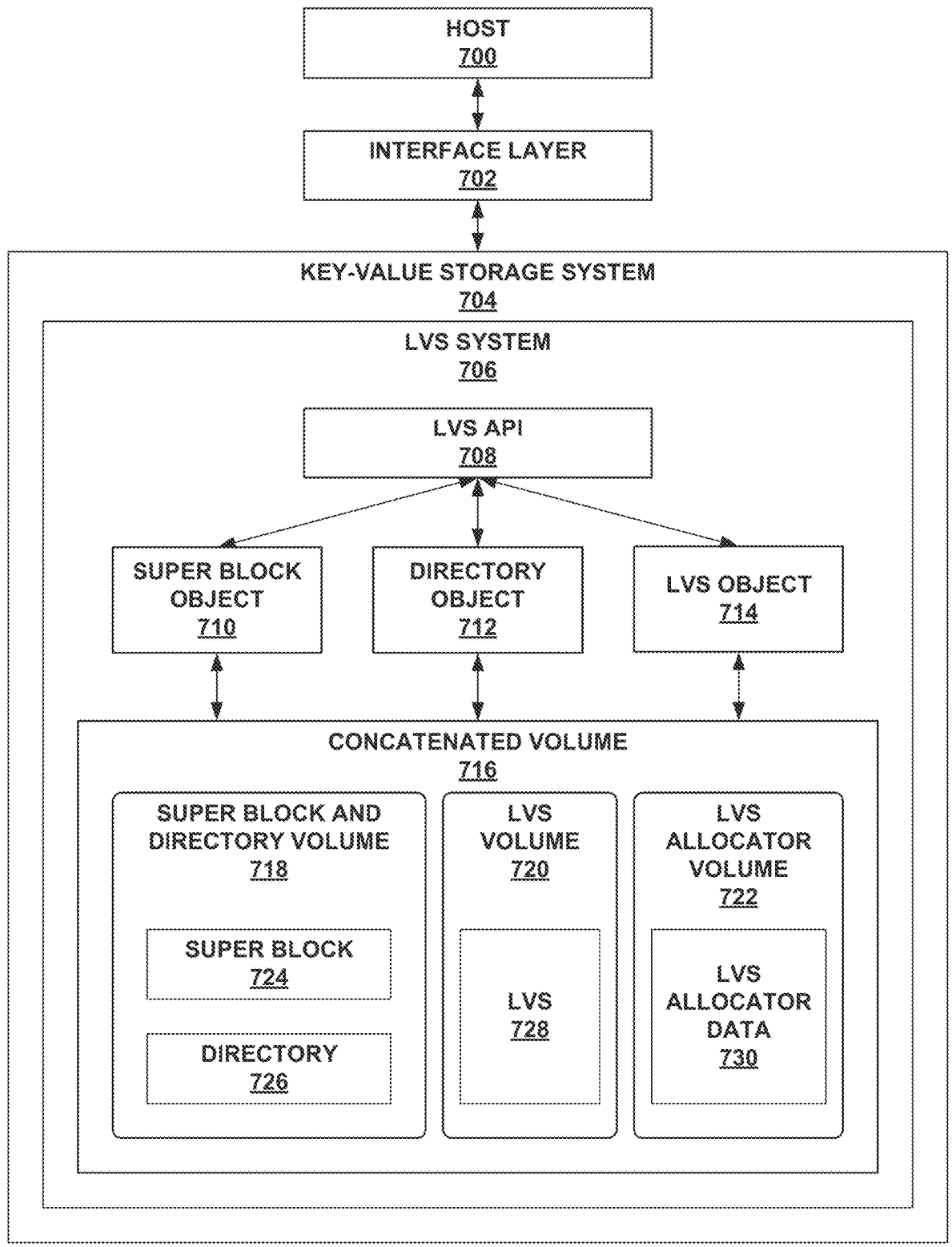
FIG. 7 is a block diagram illustrating an example software architecture for storing large value data in a key-value storage system, in accordance with one or more techniques of this disclosure.

FIG. 7 is a block diagram illustrating an example software architecture for storing large value data in a key-value storage system, in accordance with one or more techniques of this disclosure. In some examples, "large" value data may be any value data larger than a maximum value data storable in a slot in any of pages 312 (FIG. 3). Example goals that drive the design of the software architecture of FIG. 7 are similar to those driving the design of the software architecture described above with respect to FIG. 3. For instance, goals that drive the design of the software architecture of FIG. 7 may include:

- Minimizing write (for wear and performance) and read (for throughput and latency) amplifications
- Minimizing dynamic random access memory requirements.
- Minimizing storage overhead (unused space)
- Supporting encryption at rest using user managed keys.
- Providing an ability to dynamically grow the size of the store
- Providing a simple API that can be efficiently accessed from the Host or over the network.
- Supporting compression of values.

In the example of FIG. 7, a host 700 may send commands to an interface layer 702. Interface layer 702 may receive commands from a communication bus. For instance, interface layer 702 may receive commands from a PCIe bus. In some examples, interface layer 702 may be implemented in accordance with a Non-Volatile Memory Host Controller Interface Specification (i.e., NVM Express (NVMe)). In some examples, host 700 is a WUH that sends commands to key-value storage system 704 as part of processing work units. Furthermore, interface layer 702 may send responses on the communication bus to host 700. Like interface layer 302 (FIG. 3), interface layer 702 may enqueue commands and dequeue the commands for processing in a first-in-first-out manner.

Key-value storage system 704 store and retrieve of values associated with keys in response to commands received by interface layer 702. Key-value storage system 704 may have the same interface as key-value storage system 300 (FIG. 3). In the example of FIG. 7, key-value storage system 704 is implemented using a large value storage (LVS) system 706. This disclosure refers to LVS system 706 as a "large" value storage system because LVS system 706 may be used to store value data having greater sizes than the value data stored in slots of pages 312 using key-value storage system 300 (FIG. 3). Hence, in some instances, LVS system 706 may be considered to be a "large" key-value storage system while key-value storage system 300 may be considered to be a "small" key-value storage system. In the example of FIG. 3, LVS system 706 includes an LVS API 708, a super block object 710, a directory object 712, an LVS object 714, and a concatenated volume 716.

Concatenated volume 716 may include multiple sub-volumes. For instance, in the example of FIG. 7, concatenated volume 716 includes a super block and directory volume 718, a LVS volume 720, and a LVS allocator volume 722. In the example of FIG. 7, super block and directory volume 718 stores a super block 724 and a directory 726. LVS volume 720 stores LVS 728. LVS allocator volume 722 stores LVS allocator data 730. Thus, super block 724 and directory 726 are stored in a first sub-volume of concatenated volume 716; LVS data 826 is stored in a second sub-volume of concatenated volume 716; and LVS allocator data 730 is stored in a third sub-volume of concatenated volume 716. In some examples, one or more of the sub-volumes of concatenated volume 716 may each itself be a concatenated volume, e.g., in order to support growing directory 726 and/or LVS 728.

In the example of FIG. 7, super block object 710 is a software object having an interface for performing operations on accessing super block 724. Super block 724 may contain configuration data, status data, and statistical data. Directory object 712 is a software object having an interface for performing operations on directory 726. Directory object 824 may be implemented as a "small" key-value store, such as an instance of key-value storage system 300 (FIG. 3). Directory 726 may store keys and data associated with the key. LVS object 714 is a software object having an interface for performing operations on LVS 728. In some examples, when value data based on data associated with a key is smaller than a size threshold, LVS system 706 stores the value data in directory 726. In such examples, when value data based on the data associated with the key is larger than the size threshold, LVS system 706 stores the value data in LVS 728.

LVS API 708 may implement a set of functions for performing operations on a key-value store implemented by LVS system 706. For instance, LVS API 708 may coordinate operations on directory 726 and LVS 728. In some examples, LVS API 708 may implement the operations shown in Table 5, below:

TABLE 5

| | |
|---|---|
| Put(Key, Value) | Store a key/value pair |
| Get(Key) -> value | Retrieves the specified key's value |
| GetRange(Key, Range) | Retrieve part of the specified key's value |
| Retain(Key) | Increments a reference count of the specified key |
| Release(Key) | Decrement the reference count of the specified key |

When the GET command is sent as part of an NVME command over the PCIe bus, host 700 may send an address for a buffer in its memory where the contents of the value should be copied. In Table 5 above, the Get function of LVS API 708 may fail if the buffer of host 700 is too small, which may result in the Get function of LVS API 708 returning the required buffer size. The GetRange function of LVS API 708 may enforce a lower bound on the size of the requested range. The GetRange function may fail if the buffer of host 700 is too small, which may result in the GetRange function of LVS API 708 returning the minimal buffer size. In some examples, LVS API 708 does not implement the GetRange function. Thus, in such examples, data associated with keys are stored and retrieved in a single shot.

The Release function of LVS API 708 may delete a key/value pair if a reference count for the key/value pair becomes zero. In some examples, deletes (i.e., releasing the last reference to a key/value) are expected to be a small proportion of the workload. Therefore, in such examples, LVS system 706 may reuse released/fragmented space on a best-effort basis. For instance, LVS system 706 may not necessarily reuse space released by deleting value data stored in LVS 728.

In some examples, the Put function of LVS API 708 and the Get function of LVS API 708 may stream data from and to interface layer 702. Streaming the data may allow a data transfer to be pipelined, and therefore may avoid the need to allocate large buffers within an operating system. Because the data may be streamed, there is no theoretical limit on the maximum size of data associated with a key. However, an artificial limit may be enforced.

In some examples, the size of allowable data associated with a key may range from 16 bytes to 16 megabytes. In such examples, key-value storage system 704 may not support data with sizes outside this range. This range may be acceptable for a variety of use cases, such as photo data (compressed images are typically in the order of a few megabytes), video data (applications apparently/typically fragment video data to chunks in the order of a few megabytes), building blocks in a higher-level object store, and so on. In other examples, key-value system 800 may support other maximum sizes (e.g., 32 megabytes, 50 megabytes, etc.) for data.

LVS object 714 may have an interface that has methods for allocating and deallocating storage locations in LVS volume 720. For instance, LVS object 714 may have an interface that has methods similar to the malloc/free methods of the C programming language. For instance, an interface of LVS object 714 may include the following methods for allocating and deallocating storage locations in LVS 728:

Allocate(Value.Size)→ Address
Deallocate(Address) In this example, the Allocate function of LVS object 714 allocates a block of storage locations that have a size of Value.Size. Value.Size is a size of the value data. The Allocate function of LVS object 714 returns an Address object. An Address object may contain a logical block address (LBA), a block count, and a byte count. The LBA is an address of the allocated block of storage locations in LVS 728. In some examples, the LBA is a 64-bit value, or a value having another length. Additionally, the block count indicates a length (in logical blocks) of the allocated block of storage locations. In some examples, the block count is a 32-bit value, or a value having another length. Furthermore, the byte count that indicates a length in bytes of the value. In some examples, the byte count is a 32-bit value, or a value having another length. The deallocate function deallocates a block of storage locations specified by the Address object passed to the deallocate method as the Address parameter.

In addition, LVS object 714 may have an interface that has methods to read and write data in LVS 728. For instance, an interface of LVS object 714 may include the methods shown in Table 6 below for reading and writing value data in LVS volume 720.

TABLE 6

- PutValue(Address, Value)
- GetValue(Address) → Value
- GetValueRange(Address, ByteOffset, ByteCount) → Value In the example of Table 6, the PutValue method of LVS object 714 stores value data specified by the Value parameter in a block of storage locations identified by the Address object passed to the PutValue method of LVS object 714. The value data may be based on the data associated with a key. The GetValue method of LVS object 714 returns value data stored at a block of storage locations identified by an Address object passed to the GetValue method. The GetValueRange method of LVS object 714 returns value data that has a length specified by the ByteCount parameter and that starts at a byte offset specified by the ByteOffset parameter relative to the start of a block of storage locations identified by an Address object passed to the GetValueRange method of LVS object 714.

In the context of LVS system 706, directory 726 may map keys to value metadata objects. For instance, a slot in directory 726 may specify a key and a serialized value metadata object. A value metadata object may contain a size value, a compressed size value, and either a direct value or an indirect value. The size value indicates a size (e.g., in bytes) of an uncompressed version of data associated with the key. The compressed size value indicates a size (e.g., in bytes) of a compressed version of the data associated with the key. The direct value may be the compressed version of the data associated with the key if the compressed size value is less than a threshold. The indirect value may be a serialized Address object if the compressed size value is greater than the threshold.

In some examples, the Put operation of LVS API 708 attempts to compress values whose sizes are above a particular threshold. The compressed size value is a size of the value after such compression. In some examples, the Put operation of LVS API 708 performs a test (CompressedSize<Size). If (CompressedSize<Size), the Put operation of LVS API 708 stores the value (in directory 726 or LVS 728) in its compressed form. Otherwise, the Put operation of LVS API 708 stores the value in its uncompressed form.

Directory 726 and LVS 728 may be resized independently of each other. To insulate directory 726, LVS 728 and LVS allocators 828 from the layout of concatenated volume 716, each functional unit may read/write through its associated sub-volume rather than via logical offsets within concatenated volume 716.

As mentioned above, LVS API 708 may include a Put operation. In general, when performing the Put operation, LVS API 708 may determine a size value based on the data associated with the key. Additionally, LVS API 708 may allocate a block in a second volume (e.g., LVS volume 720) such that a size of the block is greater than or equal to the determined size value. Furthermore, LVS API 708 may store, in the slot in directory 726 associated with the key, an address of the block and a value indicating the size of the block. Additionally, LVS API 708 may store, in the block, value data based on the data associated with the key. For instance, LVS API 708 may store the data associated with the key, a compressed version of the data associated with the key, or other data determined based on the data associated with the key.

In some examples, the Put operation of LVS API 708 is implemented according to the pseudocode in Table 7, below:

TABLE 7

1. Lock(Key)
2. Directory.Retain(Key)
3. If key found and retained, then Unlock(Key) and return
4. CompressedValue = Compress(Value)
5. ValueMetadata.Size = Value.Size
6. ValueMetadata.CompressedSize = CompressedValue.Size
7. If ValueMetadata.CompressedSize < ValueMetadata.Size
    1. then Value = CompressedValue TABLE 7-continued 8. If ValueMetadata.CompressedSize < MaxSmallValueSize
    1. then ValueMetadata.Value = Value
    2. else
        1.ValueMetadata.Address = LVS.Allocate(Value.Size)
        2.LVS.PutValue(Address, Value)
9. RecordId = Journal.AddRecord("Put", Key, ValueMetadata)
10. Directory.Put(Key, ValueMetadata) (internal synchronization)
11. Journal.Complete(RecordId)
12. Unlock(Key)

In the pseudocode of Table 7, the Put operation of LVS API 708 obtains a lock on a key passed to the Put operation of LVS API 708. Next, the Put operation of LVS API 708 invokes a Retain method of directory object 712. The Retain method of directory object 712 increments a reference count of the specified key. The Put operation of LVS API 708 may next determine a compressed value (Compressed Value) by applying a compression method to value data (Value) passed to the Put operation. The Put operation of LVS API 708 then sets a Size attribute of a ValueMetadata object to the size of the Value. Additionally, the Put operation of LVS API 708 sets a CompressedSize attribute of the ValueMetadata object to the size of the compressed value. The Put operation of LVS API 708 may then set the Value to the compressed value if the size of the compressed value is less than the size of the value. Furthermore, if the size of the compressed value is less than the maximum size of a small value (i.e., a value that can be stored in the directory, the Put operation of LVS API 708 may set a Value attribute of the ValueMetadata object to the Value. Otherwise, if the size of the compressed value is not less than the maximum size of the small value, the Put operation of LVS API 708 may invoke the Allocate method of LVS object 714 and set an Address attribute of the ValueMetadata object to the Address object returned by the Allocate method. Additionally, the Put operation of LVS API 708 may invoke a PutValue method of LVS object 714 to store the Value object at the Address of the ValueMetadata object. Furthermore, the Put operation of LVS API 708 may invoke an AddRecord method of a Journal object to store a record of there being a Put operation associated with the Key and the ValueMetadata object. The Journal object stores records that indicate changes to LVS volume 904. The Put operation of LVS API 708 may then invoke the Put operation of directory object 712. The Put operation of directory object 712 may be the same operation as described above with respect to Table 1, above. The Put operation of LVS API 708 may then invoke a complete method of the Journal object, providing a RecordId object as a parameter. The Put operation of LVS API 708 may then release the lock on the key. In some examples, an unclean shutdown between steps 8.2.1 and 9 of Table 7 may leak space in the LVS.

As mentioned above, LVS API 708 may include a Get operation. In general, when LVS API 708 performs the Get operation, LVS API 708 may read an address stored in a slot in directory 726 associated with a key. LVS API 708 may use the address to determine a storage location in a second volume (e.g., LVS volume 720). Furthermore, LVS API 708 may determine, based on value data stored in the storage location, the data associated with the key. LVS API 708 may then return the data associated with the key. In some examples, the Get operation of LVS API 708 is implemented according to the pseudocode in Table 8, below.

TABLE 8

1. Lock(Key)
2. ValueMetadata = Directory.Get(Key)
3. If Key not found, then Unlock(Key) and return
4. if ValueMetadata.CompressedSize < MaxSmallValueSize
    1. then Value = ValueMetadata.Value
    2. else Value = LVS.GetValue(ValueMetadata.Address)
5. If ValueMetadata.CompressedSize < ValueMetadata.Size
    1. then Value = Uncompress(Value)
6. Unlock(Key)
7. Return Value In the pseudocode of Table 8, the Get operation of LVS API 708 obtains a lock on a key passed to the Get operation. Next, the Get operation of LVS API 708 invokes the Get operation of directory object 712. The Get operation of directory object 712 may be the same operation as described above with respect to Table 2, above. However, because directory 726 stores a serialized value metadata object in a slot associated with the key, the value returned by the Get operation of directory object 712 may be cast as a ValueMetadata object that has a compressed size attribute, a size attribute, and a value attribute. Additionally, as shown in Table 8, the Get operation of LVS API 708 may determine whether the Get operation of directory object 712 indicated that no value was found in the directory for the key. If the Get operation of directory object 712 indicated that no value was found in the directory for the key, the Get operation of LVS API 708 releases the lock on the key and returns. Otherwise, the Get operation of LVS API 708 determines whether a CompressedSize attribute of the ValueMetadata object returned by the Get operation of directory object 712 is less than the maximum size of a value storable in the directory (MaxSmallValueSize). If so, the Get operation of LVS API 708 sets a value to the value attribute of the ValueMetadata object. Otherwise, the Get operation of LVS API 708 sets the value to a value returned by invoking a GetValue operation of LVS object 714. If the compressed size of the value is less than the original size of the value, the Get operation of LVS API 708 uncompresses the value. The Get operation of LVS API 708 may then release the lock on the key and return the value.

Furthermore, LVS API 708 may include a Retain operation that takes a key as a parameter. In some examples, the Retain operation of LVS API 708 is implemented according to the pseudocode in Table 9, below:

TABLE 9

1. Lock(Key)
2. Directory.Retain(Key)
3. Unlock(Key)

In Table 9, the Retain operation of LVS API 708 first obtains a lock on the key. Next, the Retain operation of LVS API 708 invokes a retain operation of directory object 712. The retain operation of directory object 712 may increment the reference count for the key in directory 726. The Retain operation of LVS API 708 may then release the lock on the key.

LVS API 708 may also include a Release operation that takes a key as a parameter. In some examples, the Release operation of LVS API 708 is implemented according to the pseudocode in Table 10, below:

TABLE 10

1. Lock(Key)
2. ValueMetadata = Directory.Get(Key)
3. RecordId = Journal.AddRecord("Release", Key)
4. If key refcount == 1 and ValueMetadata.IsIndirect
    1. Then LVS.Deallocate(ValueMetadata.Address)
5. Directory.Release(Key)
6. Journal.Complete(RecordId)
7. Unlock(Key)

In Table 10, the Release operation of LVS API 708 first obtains a lock on the key. Next, the Release operation of LVS API 708 invokes the Get operation of directory object 712. The Get method of directory object 712 may be implemented as described in Table 2, above. The Release operation of LVS API 708 may store the data returned by the Get operation of directory object 712 in a ValueMetadata object. Furthermore, the Release operation of LVS API 708 may add a record to the Journal object indicating a release of the key. Additionally, if the reference count of the reference count of the key is equal to 1 and an attribute of the ValueMetadata object indicates that the value associated with the key is stored in the LVS, the Release operation of LVS API 708 invokes a Deallocate operation of LVS object 714. Furthermore, the Release operation of LVS API 708 invokes a Release operation of directory object 712. The Release operation of directory object 712 may be implemented as described elsewhere in this disclosure with respect to the delete operation of key-value API 304. The Release operation of LVS API 708 may then invoke a Complete operation of the Journal object using the RecordId returned by the AddRecord operation. This indicates completion of the Release operation of LVS API 708 in the Journal object. The Release operation of LVS API 708 may then release the lock on the key.

Figure 8:
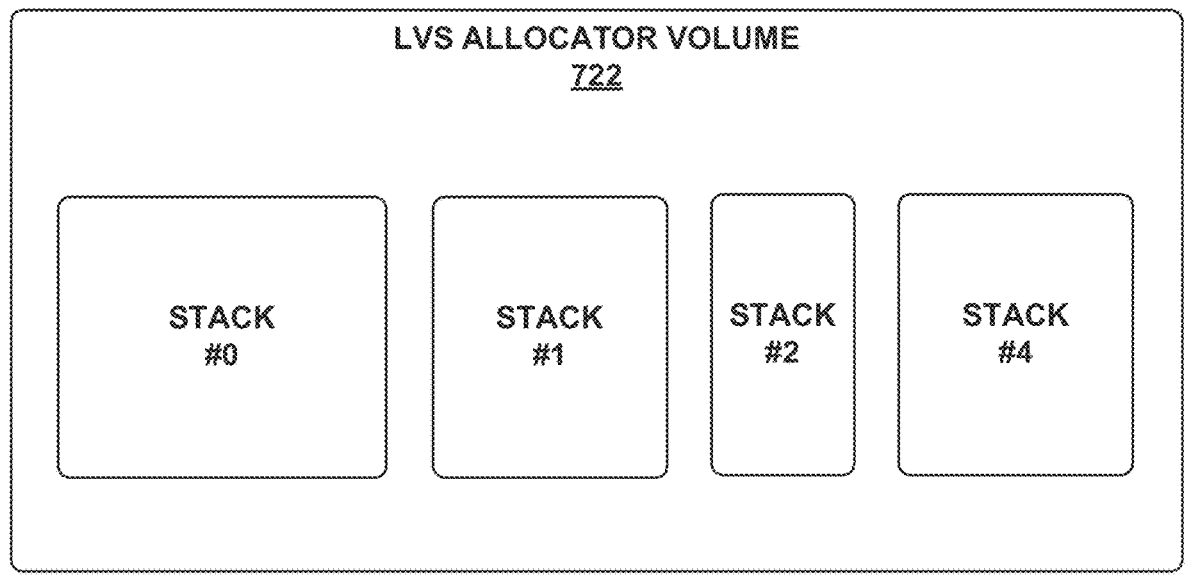
FIG. 8 is a block diagram illustrating an example large value store (LVS) allocator volume, in accordance with one or more techniques of this disclosure.

LVS system 706 may use resource locks to synchronize operations on keys and allocators. In some examples, LVS system 706 uses the following deadlock avoidance rules:
1. Lock order: Key followed by Allocator
2. Single Key lock
3. At most two allocator locks; lock smallest allocator first, lock largest allocator second FIG. 8 is a block diagram illustrating an example LVS allocator volume 722, in accordance with one or more techniques of this disclosure. In accordance with a technique of this disclosure, LVS system 706 may use a set of N allocators to manage free space in LVS volume 720 (FIG. 7). Each of the allocators pools values and free space for a particular range of sizes. For instance, in the example of Table 11, below, LVS system 706 may use four allocators, indexed from 0 to 3. In Table 11, the Allocation quantum (KiB) is the smallest amount of space in kilobytes (KiB) that an allocator can allocate. For instance, allocator 0 may allocate space in multiples of 4 KiB. Furthermore, in Table 11, the max value size of an allocator is the maximum amount of space that the allocator can allocate. For instance, allocator 0 may allocate up to 256 KiB.

TABLE 11

| Allocator | Allocation quantum (KiB) | Max value size (KiB) |
|---|---|---|
| 0 | 4 | 256 |
| 1 | 16 | 1024 |

TABLE 11-continued

| Allocator | Allocation quantum (KiB) | Max value size (KiB) |
|---|---|---|
| 2 | 64 | 4096 |
| 3 | 256 | 16384 |

In the example of FIG. 8, each allocator records free space in a corresponding stack, which is persisted to LVS allocator volume 722 (FIG. 7). The stacks contain LVS Addresses, which describe free extents within LVS 728. Thus, in the example of FIG. 8, a third volume (e.g., LVS allocator volume 722) comprises a plurality of stacks, each respective stack of the plurality of stacks corresponding to a respective range of sizes. LVS allocator data 730 (FIG. 7) may include the stacks.

Conceptually, an allocator allocates space by popping an Address from a stack. An allocator deallocates space by pushing an Address onto a stack. In some examples, to limit fragmentation, LVS object 714 always returns space to the allocator from which LVS object 714 allocated the space. In some examples, the cost of an LVS allocation is:
<1 read of the stack (with sequential read ahead of deallocated Addresses)
1 atomic write to the volume's super block (to update the stack pointer) Furthermore, in some examples, the cost of an LVS deallocation is:
1 atomic write to a stack (write the deallocated Address)
1 atomic write to the stack volume's super block (to update the stack pointer)

The popping/allocating may be batched and performed optimistically ahead of time. Likewise, the pushing/deallocating may be batched and performed lazily (e.g. one page at a time). This may amortize the cost of the allocate/deallocate operations and may allow opportunistic but limited compaction and sorting/best fit matching of free space (within in-memory stack pages) with incoming allocation requests. If a popped Address is larger than the requested allocation, its address space may be split if and only if the excess is at least as large as the minimum value size associated with the allocator from which the allocation is being made. Any split excess may be pushed back to its stack.

The largest allocator may be initialized with all the available space when LVS system 706 is created. All other allocators may be initialized in an empty/depleted state. An allocator is empty or depleted if there are no addresses remaining in the stack associated with the allocator. A depleted allocator may attempt to "refill" itself by allocating itself space from a larger non-depleted allocator.

As mentioned above, an interface of LVS object 714 may include an Allocate method for allocating storage locations, such as a block of storage locations. The Allocate method may use the allocators to manage free space in LVS volume 904. In general, as part of performing the Allocate method, LVS object 714 may determine, based on a size value indicating a size of value data based on data associated with a key, an appropriate stack from among the plurality of stacks, pop block data off the appropriate stack, and determine, based on the block data, the address of the block and the size of the block. The block data popped from the stack may specify the address of the block, or may be used to determine the address of the block.

Furthermore, in some examples, each respective stack of the plurality of stacks has a respective predetermined minimum size value. In such examples, as part of allocating the block, LVS object 714 may, based on the block data specifying a size that is greater than a fitted size by at least the minimum size value for the appropriate stack, push second space data onto the appropriate stack. In this example, the second space data may specify a start of an unused portion of the block and a size of the unused portion of the block. In this example, the fitted size may be the size value rounded up to a next multiple of the minimum size value for the appropriate stack greater than the size value. Furthermore, in this example, as part of determining the size of the block, LVS object 714 may determine that the size of the block is the size specified by the block data minus the size of the unused portion of the block. In one example, the block data is first block data and, in response to a request to perform the delete operation on the data associated with the key, LVS object 714 may push second space data onto the appropriate stack. In this example, the second space data specifies the address of the block and the size of the block.

In some examples, the Allocate method of LVS object 714 may be implemented according to the pseudocode in Table 12 below:

TABLE 12

LVS.Allocate(Value.Size) → Address

1. Allocator = GetAllocator(Value.Size)
2. Lock(Allocator)
3. Address = Allocator.PrepareAllocation(Value.Size) (this may involve further synchronization and journaling, if and only if Allocator is depleted and requires "refilling")
4. Journal.AddRecord("Allocate", Address)
5. Allocator.CommitAllocation(Address)
6. Unlock(Allocator)

In the pseudocode above, the GetAllocator method returns a reference to the Allocator object associated with the size value specified by Value. Size. Next, the Allocate method obtains a lock on the Allocator object. Obtaining the lock on the Allocator object may prevent other processes from accessing the Allocator object. Thus, two processes are unable to use the Allocator object to allocate the same storage locations in LVS volume 904. After obtaining the lock on the Allocator object, the Allocate method invokes a PrepareAllocation method of the Allocator object. The PrepareAllocation method returns an Address object. In this way, the Allocate method may pop block data off a stack associated with the Allocator object. The returned Address object specifies a set of consecutive storage locations in LVS volume 904. Additionally, the Allocate method may invoke an AddRecord method of a Journal object. The Journal object stores records that indicate changes to LVS volume 904. In the pseudocode above, the Allocate method uses the AddRecord method to add a record to the Journal object that specifies that the Address object was allocated. Furthermore, in the pseudocode above, the Allocate method may invoke a CommitAllocation method of the Allocator object. The CommitAllocation method finalizes the allocation of the set of storage locations specified by the Address object. The Allocate method may then release the lock on the Allocator object.

Furthermore, the interface of LVS object 714 may include a Deallocate method for deallocating storage locations. The Deallocate method of LVS object 714 may use also use the allocators. For instance, the Deallocate method of LVS object 714 may be implemented according to the pseudocode in Table 13:

TABLE 13

LVS.Deallocate(Address)

1. Allocator = GetAllocator(Address.Size)
2. Lock(Allocator)
3. Journal.AddRecord("Deallocate", Address)
4. Allocator.Deallocate(Address)
5. Unlock(Allocator)

In the pseudocode in Table 13 above, the Deallocate method of LVS object 714 first invokes a GetAllocator method to obtain a reference to the Allocator object associated with the size value specified by Value.Size. Next, the Deallocate method obtains a lock on the Allocator object. After obtaining the lock on the Allocator object, the Deallocate method may invoke the AddRecord method of the Journal object to record the deallocation of the set of storage locations specified by the Address object. The Deallocate method may then invoke a Deallocate method of the Allocator object to deallocate the set of storage locations specified by the Address object. In this way, the Deallocate method may push block data onto the stack associated with the Allocator object. The Deallocate method may then release the lock on the Allocator object.

As noted above, the Journal object may store records of changes to LVS volume 904. The records in the Journal object may be used to replay the changes to LVS volume 904 in the event of a failure. Replaying the changes to LVS volume 904 may restore effects on the LVS volume 904 caused by the Allocate and Deallocate methods. For instance, replay of the Allocate and Deallocate methods may feed special "Replay" allocators. Replay of Put and Allocator refill allocations, and, Release deallocations may be made from/to these "Replay" allocators. At the end of replay, any space in the "Replay" allocators should be returned to the appropriate "regular" allocator. This replay may be used when there is a crash in the system. Basically, the journal is replayed with the "Replay" allocators.

Figure 9:
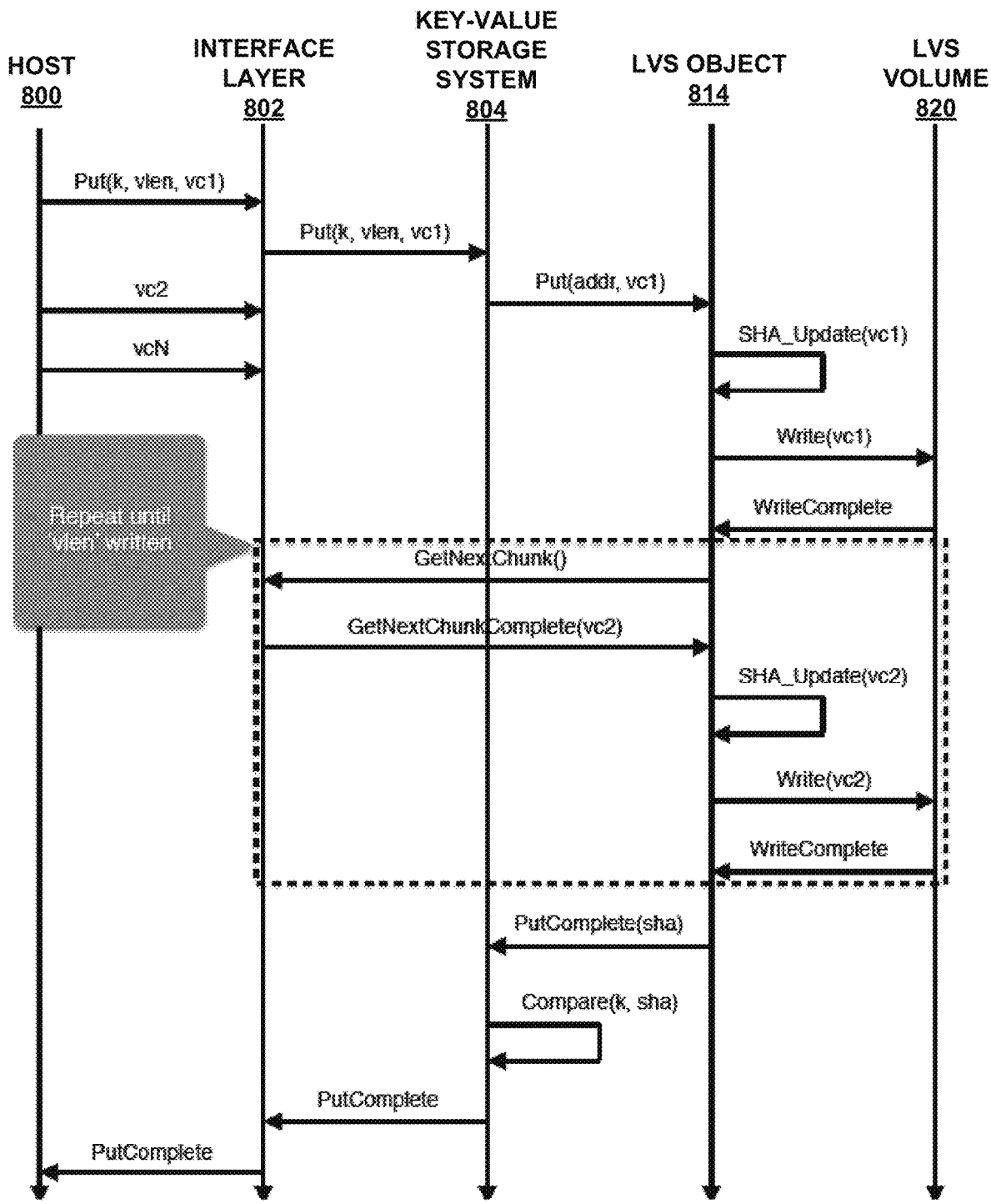
FIG. 9 is a flow diagram illustrating an example sequence for a put operation that uses a LVS system, in accordance with one or more techniques of this disclosure.

FIG. 9 is a flow diagram illustrating an example sequence for a put operation that uses LVS system 706, in accordance with one or more techniques of this disclosure. In the example of FIG. 9, host 700 (FIG. 7) starts the put operation by sending a put request to interface layer 702 (FIG. 7). The put request may include a key (k), data (vlen) indicating a value length, and a value chunk (vc1). The value chunk includes at least a portion of data associated with the key. The value length may indicate a length of the value chunk. As discussed elsewhere in this disclosure, interface layer 702 may be a NVME interface. Hence, this disclosure may refer to interface layer 702 as a NVME layer. In the example of FIG. 9, interface layer 702 sends portions of the data associated with a key to LVS system 706 in chunks. Interface layer 702 may control the size of the value chunks, although for simplicity and performance, the chunking may be block aligned. Block aligned means the size of the value chunk is a multiple of block size. A buffer containing the first value chunk is sent with the NVME's Put command to key-value storage system 704 (vc1). LVS system 706 requests buffers for further value chunks via a callback (GetNextChunk). In some examples, a SHA check is mandatory to ensure host 700 does not store bad data. A SHA check may be performed by applying a SHA hashing algorithm to the value chunk and comparing the resulting hash value to a hash value stored in the value chunk.

After interface layer 702 receives the put command from host 700, interface layer 702 may provide the put command to key-value storage system 704. Key-value storage system 704 may then provide a put command to LVS object 714. The put command provided by key-value storage system 704 to LVS object 714 may specify an address and a value chunk. For instance, LVS system 706 may invoke the PutValue method of LVS object 714, as described in Table 6, above. In the example of FIG. 9, LVS object 714 may perform a SHA update on the value chunk. The SHA update may apply a SHA hashing algorithm to the value chunk and update the value chunk to specify the resulting hash value. Additionally, LVS object 714 may then write the value chunk, which may include the hash value, to concatenated volume 716. Concatenated volume 716 may respond to LVS object 714 with an indication that the write is complete.

Furthermore, as shown in the example of FIG. 9, LVS object 714 may request a next value chunk that includes data associated with the key. For instance, LVS object 714 may provide a GetNextChunk command to interface layer 702. Interface layer 702 may then provide a next value chunk to LVS object 714. LVS object 714 may then perform the SHA update again with respect to the received value chunk. LVS object 714 may write the resulting value chunk to concatenated volume 716. Concatenated volume 716 may respond to LVS object 714 with an indication that the write is complete. LVS object 714 may continue requesting value chunks in this manner until LVS object 714 has received value chunks whose total size is equal to the vlen parameter.

After receiving value chunks whose total size is equal to the vlen parameter, LVS object 714 may provide a put complete indicator to key-value storage system 704. The put complete indicator may include a hash value (e.g., a SHA value) of the data value contained in the value chunks. Key-value storage system 704 may compare the key received in the initial put command to the hash value to determine whether the data value is corrupt. Key-value storage system 704 may then send a put completion indicator to interface layer 702, which may forward the put completion indicator to host 700.

Figure 10:
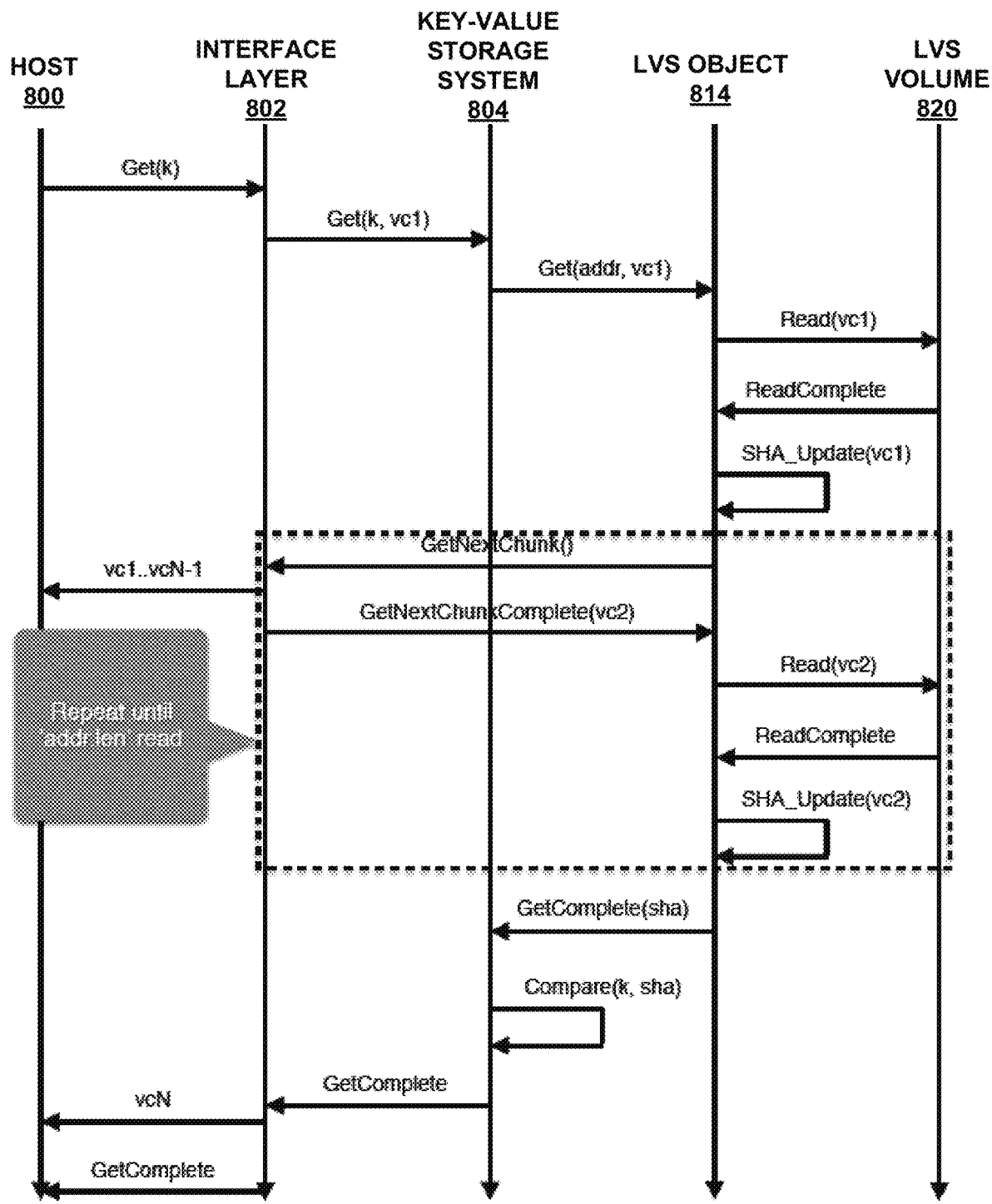
FIG. 10 is a flow diagram illustrating an example sequence for a get operation, in accordance with one or more techniques of this disclosure.

FIG. 10 is a flow diagram illustrating an example sequence for a get operation that uses LVS system 706, in accordance with one or more techniques of this disclosure. In the example of FIG. 10, interface layer 702 receives portions of a large data associated with a key from LVS object 714 in value chunks. Interface layer 702 may control the size of the value chunks, although for simplicity and performance, the chunking may be block aligned. An argument indicating a buffer containing the first value chunk may be sent with a Get command of interface layer 702 to key-value storage system 704 (vcl below). The LVS object 714 requests buffers for further chunks via a callback (GetNextChunk). The SHA check may be optional if the checksumming of concatenated volume 716 is trusted.

In the example of FIG. 10, host 700 may send a get command to interface layer 702. The get command specifies a key (k). Interface layer 702 sends a get command to key-value storage system 704. The get command sent to key-value storage system may specify the key and a buffer for storage of a value chunk. In response, key-storage system 804 may invoke a Get operation of LVS object 714 providing an address and the buffer as parameters. In response, LVS object 714 may read value data from LVS volume 720 into the buffer. LVS volume 720 may then return a read complete indicator. LVS object 714 may then perform a SHA update. To perform the SHA update, LVS object 714 may apply a hash algorithm (e.g., SHA) to the read value data and include the resulting hash value in the buffer.

Subsequently, LVS object 714 may request a next value chunk from interface layer 702. In response, interface layer 702 may send a buffer to LVS object 714. In response, object 814 may read value data from LVS volume 720 into the buffer. LVS volume 720 may then return a read complete indicator. LVS object 714 may then perform a SHA update for the read value data. Interface layer 702 may provide the buffers to host 700. This process may continue until the LVS object 714 has read an amount of data equal to a length value for the address.

After reading the value data for the last buffer, LVS object 714 may send a Get Complete indicator to key-value storage system 704. The Get Complete indicator may specify a hash value (e.g., a SHA value) for the value data. Key-value storage system 806 may compare the key to the hash value for the value data to detect whether the read value data is corrupt. Subsequently, key-value storage system 704 may send a Get Complete indicator to interface layer 702. Interface layer 702 may the send the value data of the last buffer to host 700 and may send a Get Complete indicator to host 700.

The sequencing in FIGS. 9 and 10 serializes the processing of a data transfer. It may be desirable to pipeline the processing steps to reduce the effect of latency on individual gets/puts. Two approaches are considered, one that maintains the existing stateless Put/Get APIs and one that introduces stateful OpenPut/ClosePut and OpenGet/CloseGet APIs.

In some examples, for Put operations, some serialization may be unavoidable because the value chunks may be SHA'd (to detect and prevent clients from storing bad values) and this must be performed in offset order. The processing of Put/Get may be pipelined by issuing GetNextChunk callbacks and processing GetNextChunkComplete notifications whilst waiting for the WriteComplete/ReadComplete notifications described above. Furthermore, the SHA'ing on the Get path may be eliminated (if the underlying volume's own checksum checks is trusted), or, replaced with a Cyclic Redundancy Check 32 (crc32) check (the latter would then require both SHA'ing and CRC'ing on the Put path).

Alternatively, in some examples, one of the client layers (e.g., host 700 or interface layer 702) is stateful. In such examples, the stateless Put and Get APIs are replaced or augmented with stateful OpenPut/PutRange/ClosePut and OpenGet/GetRange/CloseGet APIs. In one such example, a client may perform an "open," put/get the value (by issuing multiple PutRange/GetRange requests) and then perform a "close" as shown in Table 14 through Table 19 below:

TABLE 14

- OpenPut(key, value_size) → status[, put_handle]
  - Lock key
  - Attempt to retain key (return early with suitable status and unlock key if successful)
  - Allocate "key_state" and a "key_handle"
  - If value_size is greater than threshold, then allocate LVS space
  - Return put_handle

TABLE 15

PutRange(put_handle, lba_aligned_offset, value_chunk_i) → status
  - Enforce a minimum transfer size (equal to largest "small" value size)
  - If value is small, put value_chunk_i to the Directory and
  - return status
  - Otherwise, update SHA then put value_chunk_i to the LVS

TABLE 15-continued

- A client may have multiple PutRange requests outstanding (when putting a large value), however, they MUST be issued to the Large IKV in offset order

TABLE 16

- ClosePut(put_handle) → status
  - If value is large then check put_state.sha matches key
  - If match, then put key and LVS address to the Directory
  - Otherwise, deallocate LVS space
  - Reap put_state and invalidate put_handle
  - Unlock key

TABLE 17

- OpenGet(key[, lba_aligned_offset = 0]) → status, value_size[, get_handle]
  - Lock key
  - Allocate "get_state" and a "get_handle"
  - Return get_handle

TABLE 18

- GetRange(get_handle, lba_aligned_offset, nlb) → status, value_chunk_i
  - Enforce a minimum transfer size (equal to largest "small" value size).
  - If value is small, then get value from the directory, otherwise get a chunk of the value from the LVS.
  - A client may have multiple GetRange requests outstanding (when getting a large value), they SHOULD be issued to the Large IKV in offset order (to make the I/O sequential).

TABLE 19

- CloseGet(handle) → status
  - Reap put_state and invalidates put_handle
  - Unlock key The stateless model maintains a simple API (Put and Get) and avoids the potential for sequencing problems on the Put path. A maximum transfer size of interface layer 702 may place an upper bound on the maximal value size; the theoretical 16 bit logical block count is not an issue, however current hosts/block devices apparently limit transfers to around 1 megabyte (MiB). The stateful model may avoid the maximum transfer size limitation, at the expense of moving some complexity to the client, in particular the management of the put_state/get_state lifetimes. The functionality to retrieve sub-ranges of a value falls naturally out of the stateful model. The stateful model may offer more flexibility and interoperability.

In this disclosure, inline compression means that compression is done on the data path of the put operation. Offline compression means that the original data is put in the storage first and is compressed later. Inline compression may be desirable for the following reasons:
  Avoids I/O amplification, i.e. avoids post-processing stage that would re-read the uncompressed value, write the compressed value and then delete the uncompressed value.
  Avoids free space fragmentation when delete is an infrequent operation.
An incoming value may be streamed through a compression engine to the journal. This may allow the compressed size to be discovered prior to allocating space in LVS 728. Space for the compressed value can then be allocated before de-staging the compressed value from the journal to the LVS (i.e., moving the compressed data from the journal to the LVS). Journal space is a limited resource (e.g., in block volumes, the journal may be limited to 2 MiB), so this approach might limit put concurrency and/or consume anti-social quantities of journal space. In some examples, data may be streamed through the compression engine and then to storage media (instead of the journal). This approach may avoid the potential for (further) free space fragmentation. OpenGet with a nonzero offset may be an expensive operation.

In another example, allocate, compress, and put operations are serialized. In this example, OpenPut may lock the chosen allocator (an allocator would be chosen based on the value's uncompressed size), prior to making an uncompressed size allocation. PutRange may then write (via the compression engine) to the allocated space. Finally, ClosePut may "trim" the allocation (returning any usable excess to free space) and unlock the allocator. This may have a disadvantage that all puts to the same sized allocator would be serialized. However, this may be overcome by having multiple sets of allocators and sharding puts across the sets. OpenGet with a non-zero offset would be an expensive operation In some examples, chunk-based compression is used. In such examples, a value may be fragmented into N chunks. The chunk may be a multiple of the chosen allocator's quantum size, which means a maximum of 64 chunks (if the chunk size is 1 quantum). For simplicity, the client may be compelled to use PutRange and GetRange with multiples of the chunk size. Each PutRange operation compress its value_chunk, then allocates space for the compressed value_chunk and finally writes the compressed chunk. The N allocations may be recorded in the key's index slot. Large value I/O may become "gapped sequential" (as chunks for different keys may be interleaved). Free space may become more fragmented on delete because of the interleaving. In such examples, OpenGet with a non-zero offset may be a relative cheap operation.

If Delete is not a rare operation, LVS allocator volume 722 may have more stacks, ordered by {LVS offset, size}. In some examples, LVS allocator volume 722 may have lists instead of stacks to minimize synchronization between allocate/deallocate. In some examples, LVS allocator volume 722 may support storing a Value's data over discontiguous ranges within the LVS. In such examples, the LVS Allocate/Deallocate APIs may operate on a vector of Addresses. Furthermore, in such examples, a 16 KiB Directory value (ValueMetadata) may store 1024 LVS addresses. This may have an advantage of handling fragmentation of the free space. In some examples, LVS system 805 may implement a large value support by fragmenting Put operations internally (possibly within a Host library) and storing fragments in a small IKV. This may have an advantage of getting a finer grained deduplication implementation "for free." In some examples, LVS system 706 may let tombstones track deallocated space. This may have an advantage of simplicity.

In some of the examples provided elsewhere in this disclosure, the data associated with a key is immutable. That is, the data associated with a key cannot be changed. Having the data associated with a key be immutable may ensure that there is no duplication of the data in the key-value store.

However, in other examples, the data associated with a key may be mutable. A key-value store in which the data associated with the key are mutable may be referred to herein as a mutable key-value store (MKV). In some examples where the data associated with a key is mutable, the key and the data may be provided by a client, such as a user or a process. In contrast, one or more examples provided elsewhere in this disclosure calculate the key based on the data associated with the key. In some examples, the data may be a file (e.g., an image file, a video file, or another type of file) and the key is a file name of the file. In some examples, the key may be a uniform resource locator (URL). In other examples, the key may be an arbitrary piece of data. The key may be a byte-array with a length.

In examples where the data associated with the key is mutable, a key-value system, such as key-value storage system 300 (FIG. 3) or LVS system 706 (FIG. 7), may compute a page index from the key provided by the user. In some examples, the key-value system may use a hashing algorithm, such as a SHA256 or a MD5 hashing algorithm, to determine the page index from the key. The key-value system may use the page index to find a page (e.g., one of pages 312 (FIG. 3) or a page in directory 726 (FIG. 6)). The key-value system may then search the page for a slot containing the key. The key-value system may use this approach for implementing get, put, and delete operations as described elsewhere in this disclosure. However, in some examples, MKV stores do not support range query or ordering.

In some examples, an MKV store may use a system similar to the small key-value store described elsewhere in this disclosure. Such an MKV may be referred to as a small MKV. In some examples, in a small MKV, the maximum size of the keys and the maximum size of the values are set at the time the MKV was created. In such examples, the small MKV uses a fixed slot size for the key and value. The real size of key and value data based on the data associated with the key may be smaller than the slot size. In some examples, the maximum sizes of keys and value data may be configurable. Furthermore, in some examples of mutable and immutable key-value stores, the sizes of keys and value data may be variable. In such examples, data (e.g., in a page header of a page) may indicate the sizes of individual slots or may indicate sizes of keys and value data within individual slots.

In some examples, an MKV store uses a system similar to the LVS system described elsewhere in this disclosure. Such an MKV store may be referred to as a large MKV store. For a large MKV store, it may not be necessary to limit the size of the value data that is generated based on the data associated with the key. However, in such examples, the key size may be fixed. To ensure that the put operation is atomic in a large MKV store, a client may be required to provide the value size (i.e., the size of the data associated with the key) along with the put request.

Furthermore, in some examples, a client (e.g., host 300, host 700, etc.) may invoke a method of an API to create an MKV store. The API may be implemented by the control plane. Hence, this disclosure may refer to the method as a control plane method. In one such example, the client may provide parameters to the control plane method. The parameters may include one or more of a type parameter indicating a type of the MKV store (e.g., to create a small MKV, the type parameter may specify small MKV), an options parameter indicating whether compression is to be used in the MKV store, a maximum key size parameter that indicates a maximum key size (e.g., 8 bytes, 16 bytes, etc.), a maximum value size parameter that indicates a maximum size of value data (e.g., 256 bytes, 512 bytes, etc.), an initial number of key parameter that indicates an initial number of key in the MKV store (e.g., 1024, 2048, etc.), and a maximum number of key parameter that indicates the maximum number of keys in the MKV store (e.g., 4096, 8192, etc.). In this example, the same method may be invoked but with one or more different values for the parameters. For instance, the type parameter may specify a large MKV store and the maximum value size may be 2 GB.

In response to the control plane method be invoked, the control plane method may invoke a method implemented by a volume manager (e.g., volume manager 314 (FIG. 3) to establish the volumes used in the MKV store. For instance, the control plane method may provide one or more parameters to the volume manager method. The parameters may include a volume size parameter, a type parameter indicating a type of the MKV store, a maximum key size parameter, a maximum value data size parameter, and a maximum key number parameter. The values of the type parameter, the maximum key size parameter, the maximum value data size parameter, and the maximum key number parameter may be the same as or derived from the values of the corresponding parameters provided to the control plane method. If the type of the MKV store is a small MKV store, the control plane method may calculate the size of a volume (e.g., volume 308) needed for storage of the small MKV store based on the parameters received by the control plane method (e.g., (maximum key size plus maximum value data size) * maximum number of keys). The volume manager method may assign the unique identifier to the volume and may allocate space for the volume.

In this example, if the type of the MKV store is a large MKV store, the control plane method may invoke the volume manager method to the create a small MKV store to serve as the directory. Additionally, the control plane method may invoke the same or different method of the volume manager to create an LVS volume and an LVS allocator volume for the large MKV store, passing sizes of the LVS volume and LVS allocator volume to the volume manager method. The control plane method may calculate the size requirement of the LVS volume based on the maximum number of keys and the maximum size of the value data (e.g., a multiplication of the maximum number of keys and the maximum size of the value data). The size of the LVS allocator volume may be equal to the maximum number of keys multiplied by the size of slots in the directory. The volume manager method may assign the unique identifiers to the volumes and may allocate space for the volumes.

Table 20, below, illustrates an example comparison of the linear hash table (LHT) approach of this disclosure with other example algorithms. In Table 20, it is assumed that the probe size is k with linear hash table, N is the maximum number of pages in the system, M is the number of keys and K is the number of (key pointer) pairs a page can hold. In some examples, K is around 256 (1<<8) and M is (1<<20).

TABLE 20

| | Linear Hash Table | Hybrid Buckets. A collection of buckets. Each bucket is a LHT. | B Tree |
|---|---|---|---|
| Simplicity | Simple | A bit complex | Complex |
| Performance without caching anything in memory | Read: one to k pages. 90% can be satisfied with reading one page. Write: the cost of lookup of p number of pages and writing one page. The reasonable number of p is around 2-4. | Similar to LHT | The index level is 2-3. For each read: lookup 2-3 index pages and read the data page. For write: lookup 2-3 index pages and read/write one data page |
| Performance with caching in memory | Read: read from memory or lookup one to p pages. Write: has the same cost as above with the straightforward solution. | Similar to LHT | Most of index pages are in memory. Read: read one data page. Write: read/write one data page. |
| Resize total cost | Resize the whole hash table. Total cost is (2N). | Resize can be inside each bucket. But the total cost is still (2N). | Split a page or a branch when a page is full. Total cost is 2N + some cost of writing index pages |
| Resize policy | When a put results in a long probe or fails with pages full. The LHT may be resized when it is half full. | Similar to LHT | When a data page/index page is ⅔ full. |
| Resizing flow | All the pages in LHT will be resized at the same time. Resizing the full pages first and other non-full pages at background. | Resize operation can be spread for different buckets at different times. | The page split happens on demand. |
| Data Skew | We make the assumption that the hash algorithm is good. | Same as LHT. An LHT can transform to more compact data | Does well with any data distribution pattern |

Figure 11:
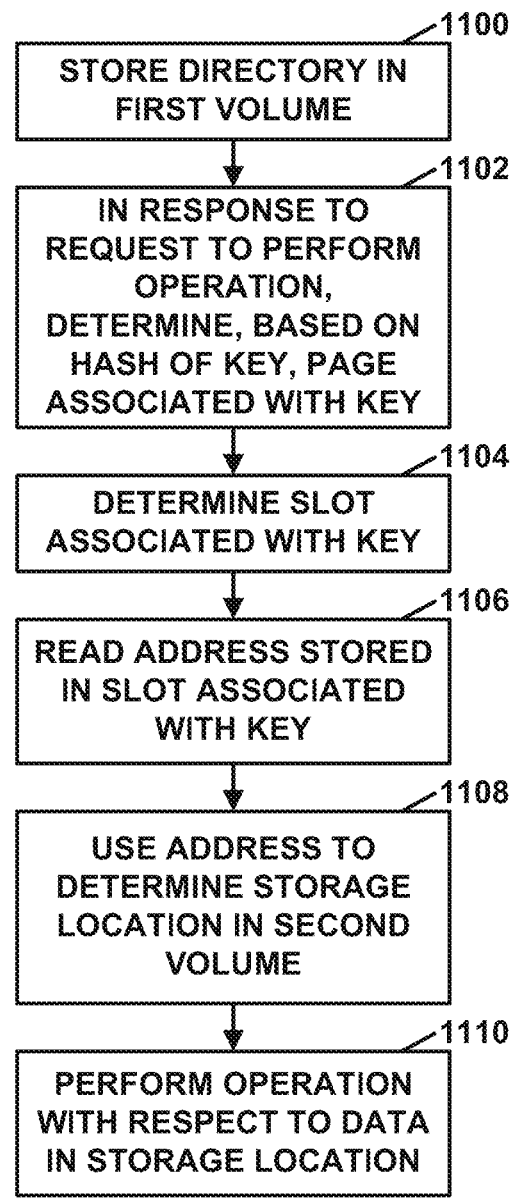
FIG. 11 is a flow diagram illustrating an example operation of an LVS, in accordance with one or more techniques of this disclosure.

FIG. 11 is a flow diagram illustrating an example operation of an LVS, in accordance with one or more techniques of this disclosure. In the example of FIG. 11, key-value storage system 704 stores a directory 726 in a first volume (e.g., super block and directory volume 718). Directory 726 comprises a plurality of pages. Key-value storage system 704 may perform actions (1102) through (1110) in response to a request to perform an operation on data associated with a key. Specifically, in the example of FIG. 11, in response to a request to perform an operation on data associated with a key, key-value storage system 704 may determine, based on a hash of the key, a page associated with the key (1102). The page associated with the key is in the plurality of pages in the directory. Key-value storage system 704 may determine the page associated with the key in accordance with the examples provided elsewhere in this disclosure, such as with respect to action (402) of FIG. 4.

Furthermore, key-value storage system 704 may determine a slot associated with the key (1104). The page associated with the key contains the slot associated with the key or contains keys used to determine the slot associated with the key. Key-value storage system 704 may determine the slot associated with the key in accordance with the examples provided elsewhere in this disclosure, such as with respect to action (404) of FIG. 4.

Furthermore, in the example of FIG. 11, key-value storage system 704 may read an address stored in the slot associated with the key (1106). Key-value storage system 704 may then use the address to determine a storage location in a second volume (e.g., LVS volume 720) (1108). Key-value storage system 704 may then perform the operation with respect to data in the storage location (1110). The operation may be a get operation, a put operation, or a delete operation, as described elsewhere in this disclosure.

Figure 12:
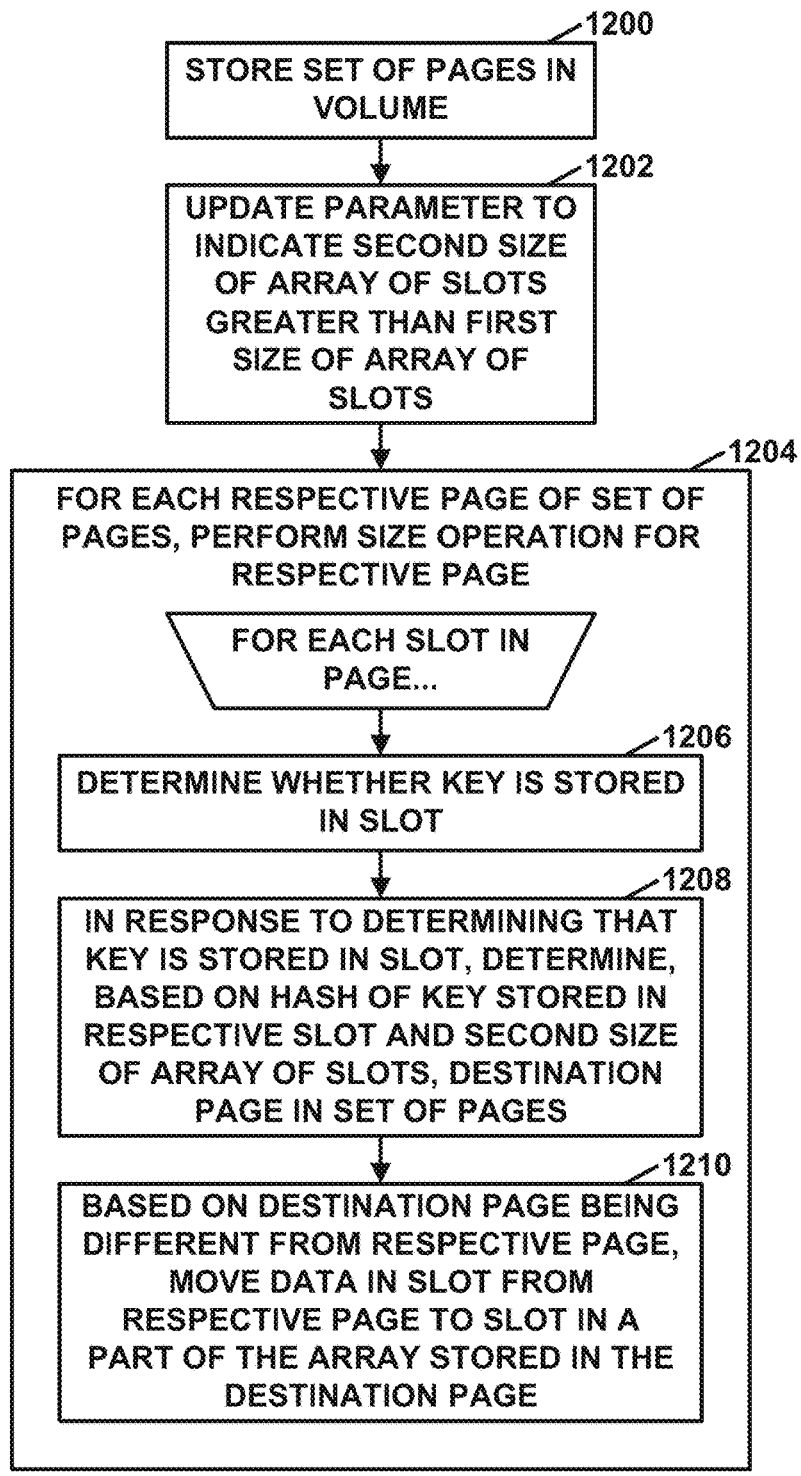
FIG. 12 is a flow diagram illustrating an example operation for resizing a key-value store, in accordance with one or more techniques of this disclosure.

FIG. 12 is a flow diagram illustrating an example operation for resizing a key-value store, in accordance with one or more techniques of this disclosure. In the example of FIG. 12, a key-value storage system (e.g., key-value storage system 300 or key-value storage system 704) may store a set of pages in a volume (e.g., volume 308 or super block and directory volume 718) (1200). Each page in the set of pages stores a respective part of an array of slots. The array of slots has a first size. Furthermore, in the example of FIG. 12, the key-value storage system may update a parameter to indicate a second size of the array of slots greater than the first size of the array of slots (1202). For instance, the second size may be a multiple of the first size.

For each respective page of the set of one or more pages, the key-value storage system may perform a resize operation for the respective page (1204). As part of performing the resize operation for the respective page, the key-value storage system may, for each respective slot in the part of the array of slots stored in the respective page, determine whether a key is stored in the respective slot (1206). In response to determining that a key is stored in the respective slot, the key-value storage system may determine, based on a hash of the key stored in the respective slot and the second size of the array of slots, a destination page in the set of pages (1208). The key-value storage system may determine the destination page in accordance with examples provided elsewhere in this disclosure, such as with respect to action (512) in FIG. 5. Based on the destination page being different from the respective page, the key-value storage system may move data in the respective slot from the respective page to a slot in the part of the array stored in the destination page (1210). The key-value storage system may move the data in accordance with examples provided elsewhere in this disclosure, such as with respect to action (516) in FIG. 5. Thus, as part of moving the data in the slot, the key-value storage system may obtain a lock on the key stored in the respective slot, store the data in the respective slot at the slot in the part of the array stored in the destination page, delete the data in the respective slot, and release the lock on the key stored in the respective slot.

The operation of FIG. 12 may allow get, put, and delete operations to occur while the key-value store is being resized. Thus, prior to performing a resize operation for a last page of the set of pages, the key-value storage system may perform a get, put, or delete operation on data in the array of slots. This may be enabled by use of the locking scheme described elsewhere in this disclosure.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for storage of data, the method comprising:
in response to a request to perform an operation on data associated with a key:
obtaining a lock on the key;
determining, based on a hash of the key, a page associated with the key, wherein:
the page associated with the key is in a set of one or more pages stored in a volume, and
each respective page of the one or more pages stores a respective part of an array of slots;
after obtaining the lock on the key, obtaining a lock on the page associated with the key; and
after obtaining the lock on the page associated with the key:
determining a slot associated with the key, wherein the part of the array of slots stored by the page associated with the key contains the slot associated with the key or contains second keys used to determine the slot associated with the key;
using the slot associated with the key to perform the operation on the data associated with the key, wherein the operation is a get operation, a put operation, or a delete operation; and
releasing the lock on the page associated with the key and the lock on the key.

2. The method of claim 1, wherein the method further comprises:
updating a parameter to indicate a second size of the array of slots greater than the first size of the array of slots; and for each respective page of the set of one or more pages:
  obtaining a lock on the respective page;
  after obtaining the lock on the respective page:
    for each respective slot in the part of the array of slots stored in the respective page:
      in response to determining that a second key is stored in the respective slot, determining, based on a hash of the second key stored in the respective slot and the second size of the array of slots, a destination page in the set of pages; and
      based on the destination page being different from the respective page:
        releasing the lock on the respective page; and
        after releasing the lock on the respective page, moving data in the respective slot from the respective page to a slot in the part of the array stored in the destination page.

3. The method of claim 2, wherein moving the data in the respective slot comprises:
  obtaining a lock on the second key stored in the respective slot;
  determining whether the second key is still stored in the respective slot; and
  based on the second key still being stored in the respective slot:
    performing the put operation to store the data in the respective slot at the slot in the part of the array stored in the destination page; and
    performing the delete operation with respect to the respective slot; and
  releasing the lock on the second key stored in the respective slot.

4. The method of claim 1, wherein:
  the operation is the get operation, and
  using the slot associated with the key to perform the operation on the data associated with the key comprises:
    determining, based on value data stored in the slot associated with the key, the data associated with the key; and
    returning the data associated with the key.

5. The method of claim 4, wherein the page associated with the key is a first page in the set of pages, and determining the slot associated with the key comprises:
  checking slots in the first page for a slot that stores the key; and
  based on none of the checked slots in the first page storing the key:
    obtaining a lock on a second, different page in the set of pages;
    checking one or more slots in the second page for a slot that stores the key;
    determining that a slot in the second page that stores the key is the slot associated with the key; and
    after returning the data associated with the key, releasing the lock on the second page,
  wherein the lock on the first page is released in response to determining that none of the checked slots in the first page stores the key.

6. The method of claim 1, wherein the operation is the put operation and using the slot associated with the key to perform the operation on the data associated with the key comprises:
  storing value data in the slot associated with the key, the value data stored in the slot associated with the key being based on the data associated with the key.

7. The method of claim 6, wherein the page associated with the key is a first page in the set of pages, and determining the slot associated with the key comprises:
  checking slots in the first page for an unused slot; and
  based on none of the checked slots in the first page being an unused slot:
    obtaining a lock on a second, different page in the set of pages;
    checking one or more slots in the second page in the set of pages for an unused slot;
    determining that the unused slot in the second page is the slot associated with the key; and
    after storing the value data in the slot associated with the key, releasing the lock on the second page,
  wherein the lock on the first page is released in response to determining that none of the checked slots in the first page stores the key.

8. The method of claim 1, wherein:
  the volume is a directory volume that comprises the page associated with the key,
  the operation is the get operation, and
  using the slot associated with the key comprises:
    reading an address stored in the slot associated with the key;
    using the address to determine a storage location in a second volume;
    determining, based on value data stored in the storage location, the data associated with the key; and
    returning the data associated with the key.

9. The method of claim 1,
  wherein the volume is a directory volume that comprises the page associated with the key, and
  wherein using the slot associated with the key comprises:
    in response to determining that the operation is the put operation, determining a size value based on the data associated with the key;
  allocating a block in a second volume such that a size of the block is greater than or equal to the determined size value;
  storing, in the slot associated with the key, an address of the block and a value indicating the size of the block; and
  storing, in the block, value data based on the data associated with the key.

10. The method of claim 9, wherein:
  a third volume comprises a plurality of stacks, each respective stack of the plurality of stacks corresponding to a respective range of sizes, and
  allocating the block comprises:
    determining, based on the size value, an appropriate stack from among the plurality of stacks;
    popping block data off the appropriate stack; and
    determining, based on the block data, the address of the block and the size of the block.

11. The method of claim 10, wherein:
  each respective stack of the plurality of stacks has a respective predetermined minimum size value,
  allocating the block further comprises based on the block data specifying a size that is greater than a fitted size by at least the minimum size value for the appropriate stack, pushing second space data onto the appropriate stack, the second space data specifying a start of an unused portion of the block and a size of the unused portion of the block, the fitted size being the size value rounded up to a next multiple of the minimum size value for the appropriate stack greater than the size value, and determining the size of the block comprises determining that the size of the block is the size specified by the block data minus the size of the unused portion of the block.

12. The method of claim 10, wherein:
the block data is first block data, and
the method further comprises, in response to a request to perform the delete operation on the data associated with the key, pushing second space data onto the appropriate stack, the second space data specifying the address of the block and the size of the block.

13. The method of claim 12, wherein a cost of the delete operation is 1 atomic write to the appropriate stack and 1 atomic write to a super block of the appropriate stack to update a stack pointer of the appropriate stack.

14. The method of claim 1, wherein the array of slots has a first size and the method further comprises:
updating a parameter to indicate a second size of the array of slots greater than the first size of the array of slots; and
for each respective page of the set of one or more pages, performing a resize operation for the respective page, wherein performing the resize operation for the respective page comprises, for each respective slot in the part of the array of slots stored in the respective page:
in response to determining that a key is stored in the respective slot, determining, based on a hash of the key stored in the respective slot and the second size of the array of slots, a destination page in the set of pages; and
based on the destination page being different from the respective page, moving data in the respective slot from the respective page to a slot in the part of the array stored in the destination page.

15. The method of claim 14, wherein moving the data in the respective slot comprises:
obtaining a lock on the key stored in the respective slot;
storing the data in the respective slot at the slot in the part of the array stored in the destination page;
deleting the data in the respective slot; and
releasing the lock on the key stored in the respective slot.

16. The method of claim 14, further comprising:
prior to performing a resize operation for a last page of the set of pages, performing a get, put, or delete operation on data in the array of slots.

17. A computing system comprising:
a storage device; and
one or more processors configured to:
in response to a request to perform an operation on data associated with a key:
obtain a lock on the key;
determine, based on a hash of the key, a page associated with the key, wherein:
the page associated with the key is in a set of one or more pages stored in a volume stored in the storage device, and
each respective page of the one or more pages stores a respective part of an array of slots;
after obtaining the lock on the key, obtain a lock on the page associated with the key; and
after obtaining the lock on the page associated with the key:
determine a slot associated with the key, wherein the part of the array of slots stored by the page associated with the key contains the slot associated with the key or contains second keys used to determine the slot associated with the key;
use the slot associated with the key to perform the operation on the data associated with the key, wherein the operation is a get operation, a put operation, or a delete operation; and
release the lock on the page associated with the key and the lock on the key.

18. The computing system of claim 17, wherein the one or more processors are further configured to:
update a parameter to indicate a second size of the array of slots greater than the first size of the array of slots; and
for each respective page of the set of one or more pages:
obtain a lock on the respective page;
after obtaining the lock on the respective page:
for each respective slot in the part of the array of slots stored in the respective page:
in response to determining that a second key is stored in the respective slot, determine, based on a hash of the second key stored in the respective slot and the second size of the array of slots, a destination page in the set of pages; and
based on the destination page being different from the respective page:
release the lock on the respective page; and
after releasing the lock on the respective page, move data in the respective slot from the respective page to a slot in the part of the array stored in the destination page.

19. The computing system of claim 18, wherein the one or more processors are configured such that, as part of moving the data in the respective slot, the one or more processors:
obtain a lock on the second key stored in the respective slot;
determine whether the second key is still stored in the respective slot; and
based on the second key still being stored in the respective slot:
perform the put operation to store the data in the respective slot at the slot in the part of the array stored in the destination page; and
perform the delete operation with respect to the respective slot; and
release the lock on the second key stored in the respective slot.

20. The computing system of claim 18,
the operation is the get operation, and
the one or more processors are configured such that, as part of using the slot associated with the key to perform the operation on the data associated with the key, the one or more processors:
determine, based on value data stored in the slot associated with the key, the data associated with the key; and
return the data associated with the key.

21. The computing system of claim 18, wherein the operation is the put operation and the one or more processors are configured such that, as part of using the slot associated with the key to perform the operation on the data associated with the key, the one or more processors:
store value data in the slot associated with the key, the value data stored in the slot associated with the key being based on the data associated with the key.

22. The computing system of claim 18, wherein:
a first volume is a directory volume that comprises the page associated with the key,
the operation is the get operation, and
the one or more processors are configured such that, as part of using the slot associated with the key, the one or more processors:
   read an address stored in the slot associated with the key;
   use the address to determine a storage location in a second volume;
   determine, based on value data stored in the storage location, the data associated with the key; and
   return the data associated with the key.

23. The computing system of claim 18, wherein:
a first volume is a directory volume that comprises the page associated with the key,
the operation is the put operation, and
the one or more processors are configured such that, as part of using the slot associated with the key, the one or more processors:
   determine a size value based on the data associated with the key;
   allocate a block in a second volume such that a size of the block is greater than or equal to the determined size value;
   store, in the slot associated with the key, an address of the block and a value indicating the size of the block; and
   store, in the block, value data based on the data associated with the key.

24. The computing system of claim 18, wherein the array of slots has a first size and the one or more processors are further configured to:
   update a parameter to indicate a second size of the array of slots greater than the first size of the array of slots; and
   for each respective page of the set of one or more pages, perform a resize operation for the respective page, wherein the one or more processors are configured such that, as part of performing the resize operation for the respective page, the one or more processors, for each respective slot in the part of the array of slots stored in the respective page:
      in response to determining that a key is stored in the respective slot, determine, based on a hash of the key stored in the respective slot and the second size of the array of slots, a destination page in the set of pages; and
      based on the destination page being different from the respective page, move data in the respective slot from the respective page to a slot in the part of the array stored in the destination page.

25. A computer-readable storage medium comprising instructions for execution by a programmable processor, wherein execution of the instructions by the programmable processor causes the programmable processor to:
   in response to a request to perform an operation on data associated with a key:
      obtain a lock on the key;
      determine, based on a hash of the key, a page associated with the key, wherein:
         the page associated with the key is in a set of one or more pages stored in a volume, and
         each respective page of the one or more pages stores a respective part of
      an array of slots;
      after obtaining the lock on the key, obtain a lock on the page associated with the key; and
      after obtaining the lock on the page associated with the key:
         determine a slot associated with the key, wherein the part of the array of slots stored by the page associated with the key contains the slot associated with the key or contains second keys used to determine the slot associated with the key;
   use the slot associated with the key to perform the operation on the data associated with the key, wherein the operation is a get operation, a put operation, or a delete operation; and
   release the lock on the page associated with the key and the lock on the key.

* * * * *